United States Patent
Hamouda et al.

(10) Patent No.: US 10,848,355 B2
(45) Date of Patent: Nov. 24, 2020

(54) METHODS AND SYSTEMS FOR COGNITIVE RADIO SPECTRUM MONITORING

(71) Applicant: VALORBEC SOCIETE EN COMMANDITE, Montreal (CA)

(72) Inventors: Walaa Hamouda, Kirkland (CA); Abdelmohsen Ali, Montreal (CA)

(*) Notice: Subject to any disclaimer, the term of this patent is extended or adjusted under 35 U.S.C. 154(b) by 154 days.

(21) Appl. No.: 15/315,826

(22) PCT Filed: Jun. 3, 2015

(86) PCT No.: PCT/CA2015/000358
§ 371 (c)(1),
(2) Date: Dec. 2, 2016

(87) PCT Pub. No.: WO2015/184524
PCT Pub. Date: Dec. 10, 2015

(65) Prior Publication Data
US 2017/0126445 A1   May 4, 2017

Related U.S. Application Data

(60) Provisional application No. 62/006,939, filed on Jun. 3, 2014.

(51) Int. Cl.
*H04L 27/00* (2006.01)
*H04B 7/04* (2017.01)
(Continued)

(52) U.S. Cl.
CPC ........... *H04L 27/0006* (2013.01); *H04B 7/04* (2013.01); *H04L 27/2666* (2013.01); *H04W 16/14* (2013.01); *H04L 5/0007* (2013.01)

(58) Field of Classification Search
CPC ............ H04L 27/0006; H04L 27/2666; H04L 5/0007; H04B 7/04; H04W 16/14
See application file for complete search history.

(56) References Cited

U.S. PATENT DOCUMENTS

| | | | |
|---|---|---|---|
| 2011/0033000 A1* | 2/2011 | Berens | .................. H04W 52/10 375/260 |
| 2012/0269201 A1* | 10/2012 | Atungsiri | ............... H04L 5/005 370/474 |

(Continued)

OTHER PUBLICATIONS

Certified Foreign Priority Document 201410211620X (May 19, 2014) for US 2017/0085326 A1.*

(Continued)

*Primary Examiner* — Melvin C Marcelo
(74) *Attorney, Agent, or Firm* — Rosenberg, Klein & Lee

(57) ABSTRACT

Cognitive radios by dynamically detecting available channels and changing their transmission or reception parameters allow increased concurrent wireless communications within a given spectrum band. It would be beneficial for such cognitive radios to exploit orthogonal frequency division multiplexing (OFDM) and accordingly establishing a spectrum monitoring technique suitable for OFDM-based cognitive radios an essential element for this. The inventors have established a technique allowing for the detection of the reappearance of the primary user within a reception period within an OFDM-based cognitive radio network and beneficially does so quickly without requiring received bit decoding and allows for different signal chain impairments to be considered. Further, the technique is applicable to address other important OFDM challenges for cognitive radios such as power leakage as well as extending the embodiments of the invention to multiple antenna systems.

22 Claims, 6 Drawing Sheets

(51) Int. Cl.
*H04W 16/14* (2009.01)
*H04L 27/26* (2006.01)
*H04L 5/00* (2006.01)

(56) References Cited

U.S. PATENT DOCUMENTS

| | | | |
|---|---|---|---|
| 2014/0051378 A1* | 2/2014 | Daneshrad | H04B 1/7102 455/307 |
| 2014/0092878 A1* | 4/2014 | Davydov | H04W 4/70 370/336 |
| 2015/0146805 A1* | 5/2015 | Terry | H04L 25/0204 375/260 |
| 2017/0085326 A1* | 3/2017 | Li | H04B 17/345 |

OTHER PUBLICATIONS

Mahmoud et a., 'OFDM for Cognitive Radio: Merits and Challenges', IEEE Wireless Communications, Apr. 2009, pp. 6-15.*

* cited by examiner

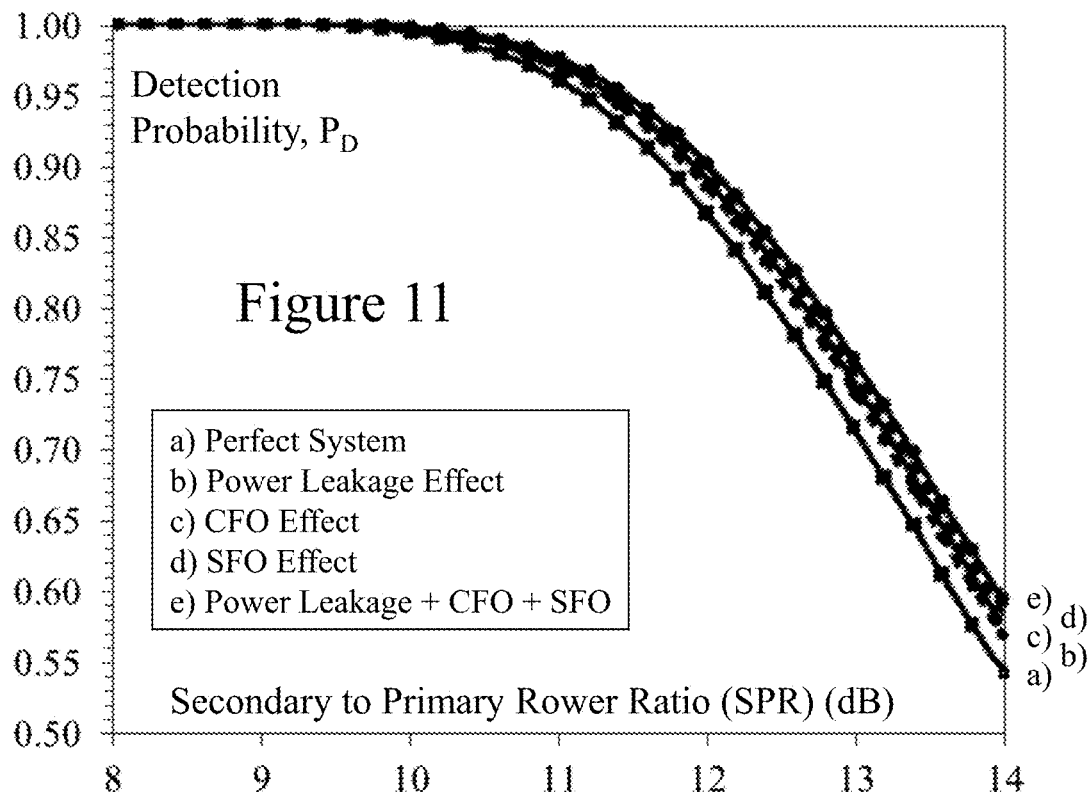
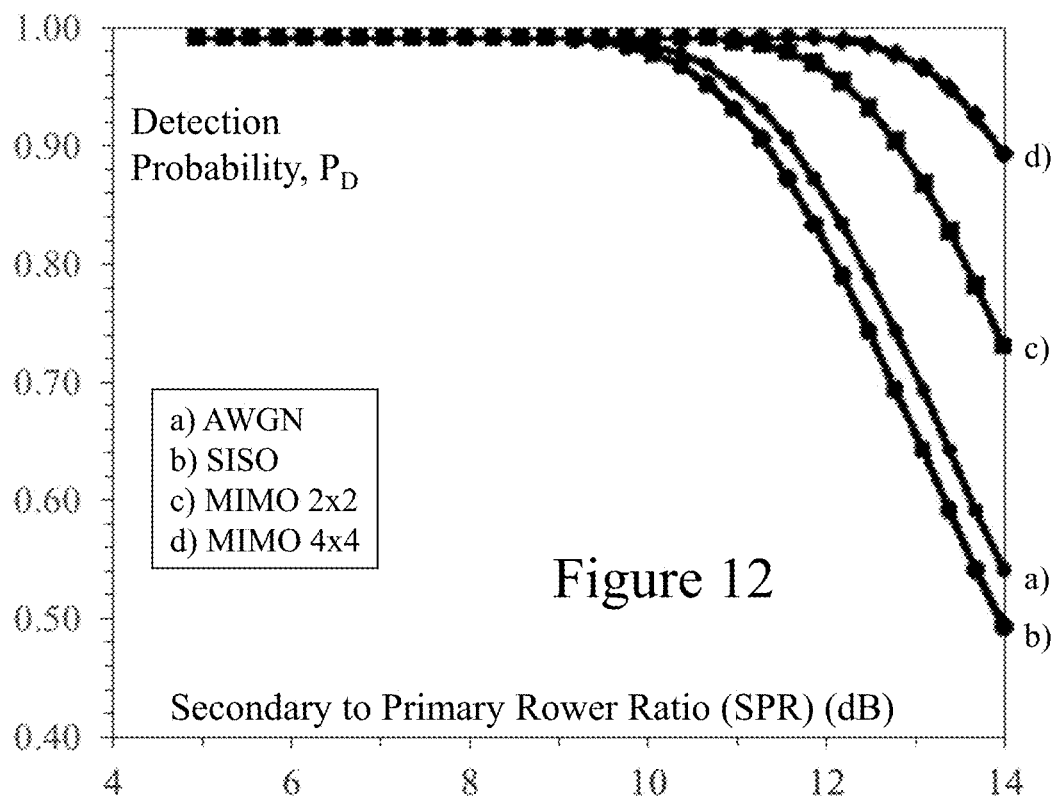

METHODS AND SYSTEMS FOR COGNITIVE RADIO SPECTRUM MONITORING

CROSS-REFERENCE TO RELATED APPLICATIONS

This patent application claims the benefit of priority from World Patent Application PCT/CA2015/000,358 filed on Jun. 3, 2015 entitled "Methods and Systems for Cognitive Radio Spectrum Monitoring", which itself claims priority from U.S. Provisional Patent Application 62/006,939 filed Jun. 3, 2014 entitled "Methods and Systems for Cognitive Radio Spectrum Monitoring", the entire contents of which are herein incorporated by reference.

FIELD OF THE INVENTION

This invention relates to spectrum monitoring during receiver reception and more particularly to spectrum monitoring for OFDM-based cognitive wireless networks.

BACKGROUND OF THE INVENTION

Wireless communication systems today have fundamentally changed how consumers, advertisers, individuals and enterprises interact, communicate, exchange, store, and utilize information through a variety of formats including text, electronic mail, video, multimedia, and plain-old-telephone-service (POTS) as well as through a variety of mobile wireless devices from cellular telephones (cellphones), personal digital assistants (PDAs), laptops, tablet PCs, portable multimedia players, and portable gaming consoles. In 2012 Cisco Systems in "Cisco Visual Networking Index—Global Mobile Data Forecast" projected that by 2016, there will be over 8 billion handheld or "personal mobile-ready" devices operating globally. In addition, nearly 2 billion "machine-to-machine" connections, including GPS systems and medical applications, will be in use. At the same time these low cost wireless network interfaces are now being deployed increasingly in sensor networks that monitor everything from temperature in office buildings to moisture in cornfields, as well as radio frequency ID tags that track merchandise at the local store and devices that monitor nursing-home patients. All these billions of electronic devices have to share a finite, and increasingly crowded, amount of radio spectrum.

All those devices will drive mobile data traffic inexorably upwards approximately 20-fold over a five year period. This data is projected to reach approximately 11 exabytes per month, or 130 exabytes a year. Put into perspective, 130 exabytes is equal to transmitting 33 feature length movies, 4.3 quadrillion MP3 files, or 813 quadrillion text messages. As a result the world's top telecommunication carriers are struggling to keep up with mobile data demands as evolutions of smartphones, Internet-capable cellphones and PDAs, tablet PCs make them increasing more affordable such that the average user will increasingly consume bandwidth and network resources as well as potentially accessing multiple services simultaneously, for example VoIP and Internet access for streaming multimedia or accessing information. Accordingly, for telecommunication service providers managing congestion as well as access for users is, and increasingly will be, an important issue. This will be further exacerbated as guaranteed network access is required, either to extend existing wired service level agreements (SLAs) for enterprises to wireless networks or where critical applications such as those relating to financial, security or medical applications are executed through the mobile devices. At the same time not every channel in every band is always in use. In fact, the US Federal Communications Commission has determined that, in some locations or at some times of day, roughly 70 percent of the allocated spectrum may be sitting idle, even though it's officially "spoken for".

Today, static spectrum access is the primary policy for wireless communications. Under this policy, fixed channels are assigned to licensed users or primary users (PUs) for exclusive use while unlicensed users or secondary users (SUs) are prohibited from accessing those channels even when they are available. Accordingly, cognitive radio (CR) systems were proposed in order to increase the utilization efficiency of the RF spectrum, see for example Haykin in "Cognitive Radio: Brain-Empowered Wireless Communications" (IEEE J. Sel. Areas in Comms., 2005, Vol. 23, No. 2, pp. 201-220). Amongst the main approaches followed by cognitive networks is the interweave network model, see for example Larsson et al. in "Cognitive Radio in a Frequency-Planned Environment: Some Basic Limits" (IEEE Trans. Wireless Comms., 2008, Vol. 7, No. 12, pp. 4800-4806) in which SUs seek to opportunistically use the wireless spectrum when the PUs are idle. Therefore, primary and secondary users are not allowed to operate simultaneously. In this case, secondary user must sense the spectrum to detect whether it is available or not prior to any communication activity.

If the PU is idle, the SU can then use the spectrum but it must be able to detect very weak signals from the primary user by monitoring the occupied band in order to quickly vacate the occupied spectrum. During this process, the CR system may spend long periods of time, known as the sensing intervals, during which the secondary transmitters are silent while the frequency band is examined. Since the CR users do not access the spectrum during the detection time, these periods are also called quiet periods (QPs), see for example Jeon et al. in "An Efficient Quiet Period Management Scheme for Cognitive Radio Systems" (IEEE Trans. Wireless Comms., 2008, Vol. 7, No. 2, pp. 505-509). Within the IEEE standard IEEE 802.22, which defines a standard for wireless regional area networks (WRANs) using the white spaces within the television (TV) frequency spectrum, a quiet period consists of a series of consecutive spectrum sensing windows using energy detection to alarm if the signal level is higher than a predefined value which indicates a non-zero probability of primary user existence. The energy detection is followed by feature detection to identify the source of energy among primary users and noise, see for example Hwang et al in "Adaptive Operation Scheme for Quiet Period in IEEE 802.22 System" (Proc. ICT Convergence (ICTC), September 2011, pp. 482-484) and Cabric et al in "Implementation Issues in Spectrum Sensing for Cognitive Radios" (Proc. 38$^{th}$ Asilomar Conference on Signals, Systems and Computers, 2004, Vol. 1, pp. 772-776). This mechanism is repeated periodically to monitor the spectrum. Once the PU is detected, the SU should abandon the spectrum in a finite period and choose another valid spectrum in the spectrum pool for communication, if available.

If the SU must periodically stop communicating in order to detect the emergence of the PU, two important impacts should be studied. Firstly, during quite periods, the SU receiver may lose its synchronization to the SU transmitter which causes an overall degradation in the secondary network performance. This becomes a problem when the underlying communication technique is sensitive to synchronization errors as in OFDM, see for example Chen et al. in "In-Band Sensing without Quiet Period in Cognitive Radio" (IEEE Wireless Comms. & Networking Conference 2008, pp. 723-728). Secondly, the throughput of the secondary network during sensing intervals reduces to zero which influences the Quality of Service (QoS) for those real-time applications like Voice over IP (VoIP), see for example Hu et al. in "Cognitive Radios for Dynamic Spectrum Access—Dynamic Frequency Hopping Communities for Efficient IEEE 802.22 Operation" (IEEE Comms. Mag., 2007, Vol. 45, No. 5, pp. 80-87). This scenario becomes more severe if the duration of the sensing intervals becomes too large as the average throughput of the secondary network is low. On the other hand, if this duration is too small, then the interference to the primary users is significant since spectrum sensing provides no information about the frequency band of interest between consecutive sensing intervals.

Accordingly, research efforts have attempted to optimize the time elapsed for spectrum monitoring by jointly finding the sensing time with the detection threshold, see for example Saifan et al. in "Efficient Spectrum Searching and Monitoring in Cognitive Radio Network" (IEEE 8th Int. Conf. Mobile Adhoc and Sensor Systems, 2011, pp. 520-529). The PU statistics are considered to protect the PU while the sensing time is minimized. In conventional systems, the traditional spectrum sensing is applied once before the SU communication and it will not be repeated again unless the monitoring technique suggests that a primary signal may be present in the band. If monitoring determines correctly that there is no primary signal in the band, then the time that would have been spent performing spectrum sensing is used to deliver packets in the secondary network. Therefore the spectrum efficiency of the secondary network is improved. If spectrum monitoring detects a primary signal in the band during a time period in which spectrum sensing would not have been scheduled, then the disruption to the primary user can be terminated more quickly and hence the impact of secondary communications on the primary user is lessened. Based on this discussion, the SU receiver should follow two consecutive phases namely sensing phase and monitoring phase where the former is applied once for a predefined period.

The alternate approach, see for example Boyd et al. in "Spectrum Monitoring during Reception in Dynamic Spectrum Access Cognitive Radio Networks" (IEEE Trans. Comms., 2012, Vol. 60. No. 2, pp. 547-558), is where the spectrum is monitored by the CR receiver during reception and without any quiet periods. This approach compares the bit error count, which is produced by a strong channel code like Low Density Parity Check (LDPC) codes, for each received packet by a threshold. If the number of detected errors is above certain value, the monitoring algorithm reports the primary user activity. The threshold is obtained by considering the hypothesis test between the receiver statistics when the primary signal is absent and the receiver statistics for the desired Secondary-to-Primary power Ratio (SPR). Although this technique is simple and adds almost no complexity to the system, the receiver statistics are subject to change by varying the system settings. In real systems, there are many parameters that can disturb the receiver error count such as RF impairments including Phase Noise (PN) and Carrier Frequency Offset (CFO), Sampling Frequency Offset (SFO), and narrowband interference (NBI). The error count will depend not only on the presence of a primary signal but it will also depend on the parameters for those impairments. Also, the receiver statistics may change from one receiver to the other based on the residual errors generated from estimating and compensating different impairments. Since it is not really feasible to study the receiver statistics for every individual CR receiver, it would in contrast be of more benefit to search for an algorithm that is robust enough to allow for synchronization errors and channel effects.

Orthogonal Frequency Division Multiplexing (OFDM) is a multi-carrier modulation technique employed in many wireless systems/standards which has proven to be a reliable and effective transmission method. For these reasons, OFDM is utilized as the physical layer modulation technique for many wireless standards including Digital Video Broadcasting—Terrestrial/Second Generation Terrestrial (DVB-T/T2), Long Term Evolution (LTE), WiMAX (IEEE 802.16d/e), and Wi-Fi (IEEE 802.11a/g). Similar to other wireless networks, OFDM is a preferred modulation technique for cognitive networks and has been already been specified for the current cognitive standard IEEE 802.22 for wireless regional area networks (WRANs). However, OFDM systems are not without challenges which require special treatment, see for example Mahmoud et al. in "OFDM for Cognitive Radio: Merits and Challenges" (IEEE Wireless Comms., 2009, Vol. 16, No. 2, pp. 6-15). These challenges include, but are not limited to, sensitivity to frequency errors and the large dynamic range of the time domain signal. Further, the finite time window within the receiver Discrete Fourier Transform (DFT) results in spectral leakage from any in-band and narrow band signal onto all OFDM subcarriers.

Accordingly, it would be beneficial to establish a spectrum monitoring technique that is suitable for OFDM-based cognitive radios. In order to provide this the inventors have established a technique, referred to as energy ratio (ER), allowing during CR reception for detection of the reappearance of the primary user within CR networks exploiting OFDM techniques. Additionally, the ER technique according to embodiments of the invention beneficially allows for different signal chain impairments, such as those arising from CFO, SFO, and NBI as well as frequency selective fading channels, to be considered. Further, it would be beneficial for the primary user reappearance to be detected quickly wherein it would be beneficial for the process to not wait for the decoding of received bits. Beneficially the ER technique according to embodiments of the invention operates over the OFDM signal chain and hence, it does not require bit decoding bits. The inventors also address via the ER technique other important OFDM challenges for cognitive radios such as power leakage as well as extending the embodiments of the invention to multiple antenna systems.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to spectrum monitoring during receiver reception and more particularly to spectrum monitoring for OFDM-based cognitive wireless networks.

In accordance with an embodiment of the invention there is provided a method of determining whether a primary transmitter is active at a secondary receiver based upon the output of an algorithm in execution upon a digital processing circuit employing data relating to a plurality of reserved tones within the signals received by the secondary receiver.

In accordance with an embodiment of the invention there is provided a method of determining whether a primary transmitter is active by processing received signals at a secondary receiver to combine reserved tones from a plurality of different communication symbols within the received signals and making a determination in dependence upon at least the combined reserved tones.

In accordance with an embodiment of the invention there is provided a method of transmitting data within a frame according to a wireless protocol wherein a plurality of reserved frequency tones associated with each frame within the wireless protocol are assigned dynamically.

In accordance with an embodiment of the invention there is provided a method of transmitting data within a frame according to a wireless protocol comprising establishing a plurality of predetermined sequences of reserved frequency tones, receiving data for transmission, and generating a symbol for transmission in dependence upon at least the data for transmission and a predetermined sequence of the plurality of predetermined sequences of reserved frequency tones.

In accordance with an embodiment of the invention there is provided a method of transmitting data within a frame according to a wireless protocol wherein a plurality of reserved frequency tones associated with each frame within the wireless protocol are assigned dynamically for generating symbols for use in transmitting the data such that over a predetermined period of time the plurality of reserved frequency tones span a predetermined frequency range associated with the wireless protocol.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 11 depicts power leakage, CFO, and SFO effects on the energy ratio algorithm at $P_{FA}=0.025$ according to an embodiment of the invention; and FIG. 12 depicts Rayleigh fading channel effect on energy ratio for SISO and MIMO systems taking power leakage and ICI into consideration for $P_{FA}=0.025$ and N=128 according to an embodiment of the invention.

DETAILED DESCRIPTION

Figure 1:
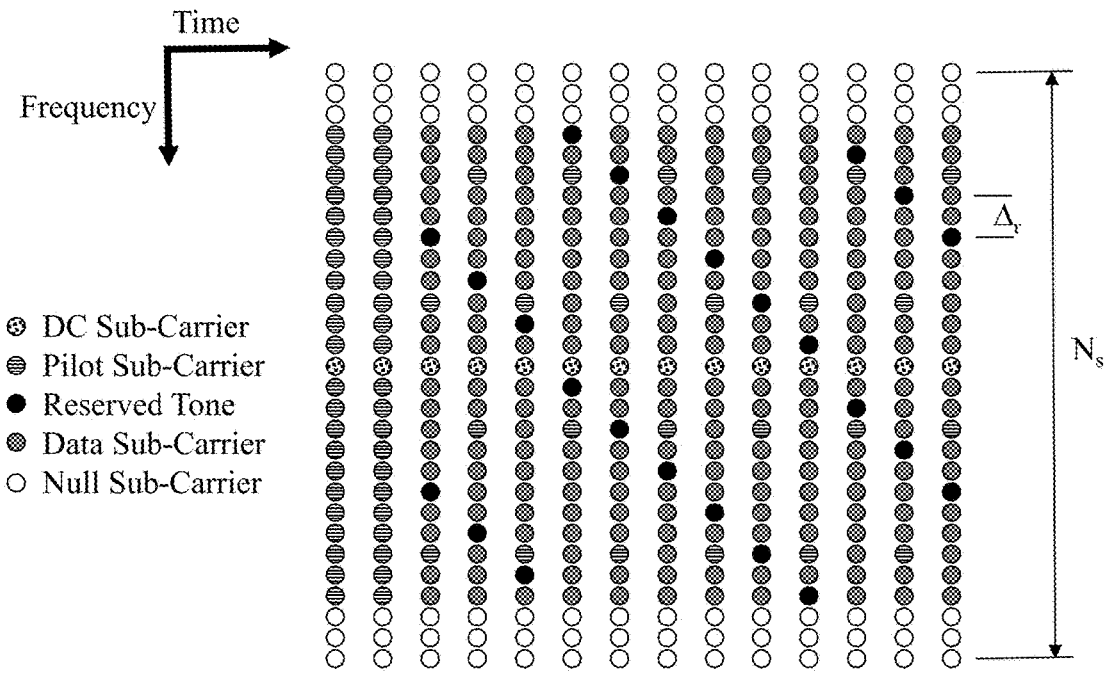
FIG. 1 depicts time-frequency allocation for a single OFDM frame to explore different sub-carrier types according to an embodiment of the invention.

The present invention is directed to spectrum monitoring during receiver reception and more particularly to spectrum monitoring for OFDM-based cognitive wireless networks.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "mobile electronic device" (MED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, an electronic reader, sensor, a vehicle, a mechanical system, a robotic system, an android system, a sensor, point of sale terminal, a wearable device and a portable Internet enabled appliance.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "radio" as used herein may refer to, but is not limited to, a device forming part of a device including, but not limited to, fixed electronic devices and mobile electronic devices, communicating with one or more communication networks via one or more wireless protocols and/or wireless standards.

"Cognitive radio" as used herein may refer to, but is not limited to, an intelligent radio that can be programmed and configured dynamically. This includes, but is not limited to, transceivers designed to use the best wireless channels in its vicinity; a radio that automatically detects available channels in wireless spectrum and changes its transmission or reception parameters to allow more concurrent wireless communications in a given spectrum band at one location; a radio exploiting dynamic spectrum management; a cognitive radio capable of configuring radio system parameters in dependence upon sensed and/or communicated network characteristics and/or wireless environment characteristics; a wireless device capable of configuration one or more parameters including, but not limited to, waveform, protocol, operating frequency, and network; an autonomous device functioning within a communications environment, exchanging information about the environment relating to the network(s) it accesses and other cognitive radios; a wireless device capable of changing the frequency and/or frequency band used between nodes within a path; and a wireless device exploiting software defined parameters dynamically changing protocols between messages within consecutive nodes.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a MED and/or FED in order to control and/or manage aspects of the cognitive radio performance and/or operation.

A: System Model

In order to demonstrate the spectrum monitoring algorithm(s) according to embodiments of the invention the inventors established a secondary user physical layer model which is close to the OFDM system presented by Mahmoud. At the transmitter side, data coming from the source is firstly segmented into blocks where each block is randomized, channel encoded, and interleaved separately. After interleaving, the data is modulated by a constellation mapper. The frequency domain OFDM frame is then constructed by combining:

(a) one or more training symbols or preambles that are used for both time and frequency synchronization at the receiver side;

(b) the modulated data; and (c) the binary phase-shift keying (BPSK) modulated pilot signals which are used for data-aided synchronization algorithms employed by the receiver.

Each $N_S$ encoded complex data symbols generated by the frame builder are then used to construct one OFDM symbol by employing the Inverse Discrete Fourier Transform (IDFT) block that is used to synthesize the OFDM symbol, where $N_S$ denotes the number of sub-carriers per one OFDM symbol. Thus, the $n^{th}$ time-domain sample of the $m^{th}$ symbol can be expressed by Equation (1) where $C(k,m)$ is the modulated data to be transmitted on the $m^{th}$ OFDM symbol with the $k^{th}$ sub-carrier.

$$s(n,m) = \frac{1}{\sqrt{N_S}} \sum_{k=-N_S/2}^{N_S/2-1} C(k,m) e^{j2\pi kn/N_S} \quad (1)$$

In order to reduce the effect of Inter-Symbol Interference (ISI), the last $N_g$ samples of the time domain OFDM symbol are copied to the beginning of the symbol in order to form a guard time or cyclic prefix. Therefore, the OFDM block has a period of $T_s=(N_S+N_g)/F_S$ where $F_S$ is the sampling frequency. At the receiver, the inverse blocks are applied. After timing synchronization (frame detection, start of symbol timing, and SFO estimation and compensation) and frequency synchronization (CFO estimation and correction), the cyclic prefix is removed. Then, the received OFDM symbol is transformed again into the frequency domain through a $N_S$ Discrete Fourier Transform (DFT). The channel is then estimated and the received data is equalized. The complex data output is then mapped to bits again through the processes of de-mapping, de-interleaving, decoding, and de-randomization are applied later to the received block to recover the original source bits.

From the network viewpoint, we consider a cognitive radio network of K SUs and one PU. The PU occupies a spectrum of a certain bandwidth for its transmission, while the same spectrum is shared by the SUs. In fact, the spectrum is totally utilized by one SU, known as the master node, to send different data to the other K−1 SUs, the slave nodes. Orthogonal Frequency Division Multiple Access (OFDMA) assumes the spectrum and time are divided into distinct and non-overlapping channels for different slaves, so that interference between the slaves is avoided. In this case, the master node sends the same pilots to all slaves but the data sub-carriers are allocated in time and frequency for different users based on a predefined scheduling technique. Actually, this model is basically introduced for Frequency Division Multiple Access (FDMA), see for example Gong et al. in "Optimal Bandwidth and Power Allocation for Sum Ergodic Capacity under Fading Channels in Cognitive Radio Networks" (IEEE Trans. Signal Processing, 2011, Vol. 59, No. 4, pp. 1814-1826), but is modified to suit the OFDM environment.

B. Energy Ratio Algorithm

On the time-frequency grid of the OFDM frame and before the IDFT, a number of tones, $N_{RT}$, are reserved for the spectrum monitoring purposes. These tones are reserved for the whole time except for the time allocated for training symbol(s) in order not to change the preamble waveform, which is used for synchronization at the receiver. The proposed OFDM frame is shown in FIG. 1 wherein we allocate the reserved tones dynamically so that their indices span the whole band when successive OFDM symbols are considered in time. The tones are advanced by $\Delta_r$ positions every OFDM symbol. When the last index of the available sub-carriers is reached, the spanning/allocation starts again from the first sub-carrier. Hence, by considering small values for $\Delta_r$, the reserved tone sequence injected to the energy ratio spans the whole band. The purpose of this scheduling is so that the primary user may have some spectrum holes because of using OFDM as well. If the reserved tones from the SU were synchronized with those spectrum holes in the PU side, then the PU signal cannot be monitored by observing those null sub-bands. On the contrary, if the PU uses a traditional single carrier modulation technique, like QAM for example, then this issue does not impact the algorithm as the PU signal has a flat spectrum across the entire band, see for example Larsson. The reserved tones typically occupy a narrow band and the primary to secondary channel may introduce notch characteristics to this narrow band resulting in detecting lower primary power levels, which is referred to commonly as the narrow band problem. Accordingly, rescheduling the reserved tones by changing the value of $\Delta_r$, over time mitigates the channel effect and protects the overlap of the SU reserved tones from falling into the PU side spectrum holes. It would be apparent to one skilled in the art that the plurality of SUs should know the code for this scheduling upon in advance. Accordingly, the establishment of this code may form part of the initial SU node association to the network or it may be programmed into the SU node such that the code in use is based upon date/time information, for example, although other synchronization methods including secondary communication links, etc. may be employed without departing from the scope of the invention.

Whilst within FIG. 1 there are depicted two reserved tones with a constant separation where the tones are viewed as a cyclic set it would be evident that optionally, the number of reserved tones may be varied, the separation of the tones varied, etc. according to parameters relating to the wireless system and/or protocol.

Based upon the signal(s) on the reserved tones received at the receiver then the secondary user can monitor the band and test the primary user existence. In fact, a traditional radiometer may be employed to measure the primary signal power and the secondary noise power by accumulating energy over those reserved tones. As a result, the primary signal power can be detected of this energy exceeds a predetermined threshold. However, it is not preferred when energy detection is employed to identify the primary user's presence from the reserved tones. This arises as the approach does not necessarily guarantee the primary user detection as the spectral leakage of the neighboring sub-carriers will affect the energy at the reserved tones even when there is no in-band primary signal, see for example Ihalainen et al. in "Spectrum Monitoring Scheme for Filter Bank Based Cognitive Radios" (Future Network and Mobile Summit, 2010, pp. 1-9. IEEE, 2010).

Accordingly, the inventors have established an alternative decision making criterion that has improved immunity for this power leakage. In fact, embodiments of the invention allow for power leakage, ICI resulting from the residual CFO and SFO errors, and even the effect of NBI to overcome.

Figure 2:
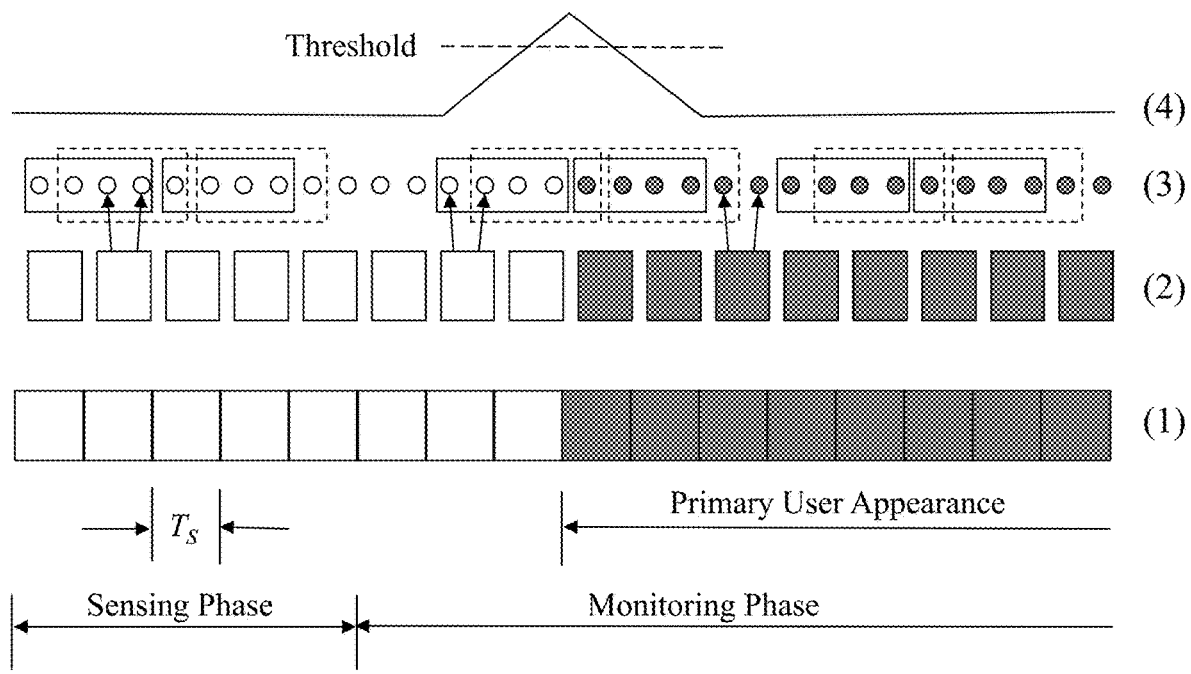
FIG. 2 presents energy ratio processing details according to an embodiment of the invention depicting (1) the time domain sequence for the OFDM blocks, (2) frequency domain samples, (3) reserved tones processing with two sliding windows for $N_{RT}=2$ and $N=4$, and (4) decision making variable, $X_k$.

The overall algorithm is illustrated by FIG. 2. It is assumed that the primary signal appears after some time during the monitoring phase. At the secondary receiver, after cyclic prefix (CP) removal and frequency domain processing are performed on the received signal, the reserved tones from different OFDM symbols are combined to form one sequence of complex samples. Two consecutive equally sized sliding windows are passed over the reserved tone sequence in the time direction. The energy of the samples that fall in one window is evaluated and the ratio of the two energies is taken as the decision making variable. Accordingly, the inventors refer to the algorithm according to embodiments of the invention as an energy ratio (ER) algorithm or simply energy ratio.

The algorithm aims to check the change in variance on the reserved tones over time. In mathematical form, let $Z_i$ be the $i^{th}$ sample of the reserved tone sequence. The decision making variable, $X_k$, can be defined by Equation (2) where N is the number of samples per window, $U_k$ is the energy of the second window, $V_k$ is the energy of the first window, and k is an integer such that k=1, 2, 3, . . . .

$$X_k = \frac{U_k}{V_k} = \frac{\sum_{i=N+k}^{2N+k-1} |Z_i|^2}{\sum_{i=k}^{k+N-1} |Z_i|^2} \quad (2)$$

It is important to note that the energy ratio algorithm according to the embodiments of the invention is active during the spectrum sensing phase in order to fill the sliding windows with the noisy reserved tones and that the energy ratio algorithm starts processing from the beginning of the sensing phase. This means that the decision making variable is evaluated during both the sensing and monitoring phases but it provides for decisions only during the monitoring phase. During the sensing phase if the decision from the spectrum sensing algorithm is that the PU is inactive, then the energy ratio algorithm has been properly calibrated to be able to detect the appearance of the PU during the monitoring phase. Accordingly, when the receiver switches from the sensing phase to the monitoring phase, it is sure that there is no primary user in band. Further, the energy ratio does not exhibit hysteresis as it is well-calibrated. During the monitoring phase, the receiver monitors the reserved tones by evaluating the parameter, $X_k$. If it exceeds a certain threshold, then the secondary user assumes that there is a power change on the reserved tones which is perhaps due to the primary user appearance and it is time to vacate the band. If not, the secondary user can continue transmission. Indeed, if there is no primary user in band, then the energy of each window will only involve the strength of the unwanted signals including the noise, the leakage from the neighbouring sub-carriers, and the effects of ICI produced by the residual synchronization errors. Therefore, if N is large enough, the ratio will be very close to unity since the strength of the unwanted signals does not change significantly over time.

Once the primary user appears, the second window will have two types of signaling present which are the primary user interference and the unwanted signals. Meanwhile, the first window will only maintain the unwanted signals without the primary user interference. The ratio of the two energies will result in much higher values therefore, for large N, when compared to the near unity value when the primary user is not present. The value will of course depend on the primary user power. When the two windows slide again, the primary signal plus the unwanted signals will be observed by the two windows and the decision making variable returns to the initial state in which the ratio is close to unity. Accordingly, we expect that the decision variable produces a spike when the primary user is detected. Otherwise, it changes very slowly maintaining the energy ratio close to unity as shown in FIG. 2 part (4). This approach therefore accounts for the resistance to different impairments present in the received signal on account of reducing the throughput of the secondary user by the ratio of the number of reserved tones to the number of useful tones. However, this reduction can be easily overcome since OFDM systems allow adaptive modulation where good conditioned sub-carriers are loaded with higher modulation order.

For the previous discussion, it is assumed that the primary user should appear at the boundaries of the OFDM blocks. Therefore, the reserved tones should have the full power that is supposed to be for those sub-carrier indices, of the primary user when it is active. In reality, the primary user may appear any time within any OFDM block in the monitoring phase. In this case, we have to consider two effects. Firstly the FFT window applied by the SU receiver will have a time-shifted version of the PU signal which involves a phase rotation to the PU sub-carriers. Since the energy is the useful parameter for the energy ratio algorithm according to embodiments of the invention then this phase shift is acceptable as it has no effect on the algorithm. Secondly, the power on the reserved tones will not have the full power transmitted by the primary user on those sub-carriers since part of the signal is truncated. However, the next OFDM symbol will have that full power. Similar to the near-far problem, if the PU power is large enough, then the reserved tones forming the first OFDM symbol are considered to be full. Otherwise, the reserved tones from the first OFDM symbol are considered as noise if $N \gg N_{RT}$.

C. Energy Ratio Analysis for AWGN Channels

In order to verify the energy ratio algorithm according to embodiments of the invention we initially analyze the energy ratio technique assuming perfect synchronization and neglecting the leakage power effect under an average white Gaussian noise (AWGN) channel for the SU. However, these issues will be considered and their effects will be studied in the next section. Throughout the analysis, it is assumed that the signal to be detected does not have any known structure that could be exploited. Furthermore, as the PU signal passes over its own multipath channel then any received time domain PU signal may be modelled via a zero-mean circularly symmetric complex Gaussian (CSCG) distribution. This is also true for the case of Rayleigh fading channels as discussed below in respect of section E entitled Rayleigh Fading Channel and Multi-Antenna System. It is worth noting that proper scaling to both the IDFT and DFT operations, like that defined in Equation (1), make the transformation a unitary one. As a result, the PU signal after DFT will still follow a CSCG distribution.

The target of this analysis is to find the receiver operating characteristics (ROC) represented by the probability of detection, $P_D$, and probability of false alarm, $P_{FA}$. The detection probability is the probability of detecting a primary signal when it is truly present while the false alarm probability is the probability that the algorithm incorrectly decides that the primary user is present when it is actually not.

As we are dealing with a two state model in which the channel is assumed to be idle or busy by the primary user, then we wish to discriminate between the two hypotheses $H_0$ and $H_1$, where $H_0$ assumes that the primary signal is not in band and $H_1$ assumes that the primary user is present. Using the energy ratio algorithm, one can define these hypotheses as given by Equation (3) where it is assumed that the samples contained in the first window have a variance of $\sigma_v^2$ and the samples enclosed by the second window have a variance of $\sigma_u^2$.

$$\begin{cases} H_0: & X = \frac{U}{V}, \quad \sigma_u^2 = \sigma_v^2 \\ H_1: & X = \frac{U}{V}, \quad \sigma_u^2 > \sigma_v^2 \end{cases} \quad (3)$$

The performance of the detector is quantified in terms of its ROC curve, which represents the probability of detection as a function of the probability of false alarm. By varying a certain threshold, $\gamma$, the operating point of a detector can be chosen anywhere along the ROC curve. Accordingly, the $P_{FA}$ and $P_D$ can be defined by Equations (4) and (5), respectively.

$$P_{FA} = P[X > \gamma | H_0] \quad (4)$$

$$P_D = P[X > \gamma | H_1] \quad (5)$$

Clearly, the fundamental problem of detector design is to choose the detection criteria, and to set the decision threshold $\gamma$ to achieve good detection performance. Detection algorithms are either designed in the framework of classical statistics or in the framework of Bayesian statistics, see for example Kay et al. in "Fundamentals of Statistical Signal Processing: Detection Theory" (Prentice Hall, 1998). In the classical case, either $H_0$ or $H_1$, is deterministically true, and the objective is to maximize $P_D$ subject to a constraint on $P_{FA}$ known as the Neyman-Pearson (NP) criterion. In the Bayesian framework, by contrast, it is assumed that the source selects the true hypothesis at random, according to some priori probabilities. The objective is to minimize the so-called Bayesian cost. Within the following discussion of embodiments of the invention the classical case is followed. Hence, initially the Probability Density Function (PDF) and the Cumulative Distribution Function (CDF) of the decision variable are derived. Next, both the detection and the false alarm probabilities are evaluated in closed-forms.

C1. Energy Ratio PDF and CDF Evaluation

Since the samples of the reserved tone sequence follow a zero-mean circularly symmetric complex Gaussian distribution, then the energy contained in one window will follow a Chi-Square distribution and the PDFs for the random variables U and V can be written as Equations (6) and (7) respectively, see for example Digham et al. in "On the Energy Detection of Unknown Signals over Fading Channels" (IEEE Intl. Conf. Comm., 2003, Vol. 5, pp. 3575-3579).

$$f_U(u) = \frac{1}{2^N \sigma_u^{2N} \Gamma(N)} u^{N-1} e^{-u/(2\sigma_u^2)}, \, u > 0 \quad (6)$$

$$f_V(v) = \frac{1}{2^N \sigma_v^{2N} \Gamma(N)} v^{N-1} e^{-v/(2\sigma_v^2)}, \, v > 0 \quad (7)$$

The CDF for the random variable X and hence the PDF, can be evaluated as given by Equations (8) and (9), respectively, where the two random variables U and V are assumed to be independent. It would be evident to one skilled in the art that the PDF for X follows a scaled F-distribution with mean $m_X = (\Gamma(N-1)\Gamma[N+1]/\Gamma^2(N)) \times (\sigma_u^2/\sigma_v^2)$ and variance $\mathrm{Var}(X) = (\Gamma(N-2)\Gamma[N+2]/\Gamma^2(N)) \times (\sigma_u^2/\sigma_v^2)$. The CDF for X can be derived in a closed-form as given by Equation (10), where $I_b(N,N)$ is the regularized incomplete beta function with the parameters b and N.

$$\begin{aligned} F_X(x) &= P[U \leq xV] \\ &= \int_0^\infty \int_0^{xv} f_{UV}(u,v) du dv \\ &= \int_0^\infty \int_0^{xv} \frac{1}{2^{2N} \sigma_v^{2N} \sigma_u^{2N} \Gamma(N) \Gamma(N)} \\ &\quad u^{N-1} e^{-u/(2\sigma_u^2)} v^{N-1} e^{-v/(2\sigma_v^2)} du dv \\ &= \frac{1}{2^{2N} \Gamma^2(N)} \int_0^\infty \left[ \int_0^{xv' \sigma_v^2/\sigma_u^2} u'^{N-1} e^{-u'} du' \right] v'^{N-1} e^{-v'} dv' \end{aligned} \quad (8)$$

$$f_x(x) = \frac{d}{dx} F_X(x) \quad (9)$$

$$= \frac{1}{2^{2N}\Gamma^2(N)} \int_0^\infty \left[ \int_0^{xv'\sigma_v^2/\sigma_u^2} u'^{N-1} e^{-u'} du' \right] v'^{N-1} e^{-v'} dv'$$

$$= \frac{1}{2^{2N}\Gamma^2(N)} \int_0^\infty \left[ \left( \frac{v'\sigma_v^2}{\sigma_u^2} \right) \left( \frac{xv'\sigma_v^2}{\sigma_u^2} \right)^{N-1} e^{-xv''\sigma_v^2/\sigma_u^2} \right] v'^{N-1} e^{-v'} dv'$$

$$= \frac{x^{N-1}}{\Gamma^2(N)} \left( \frac{\sigma_v^2}{\sigma_u^2} \right)^N \frac{\Gamma(2N)}{(1+x\sigma_v^2/\sigma_u^2)^{2N}}$$

$$\left[ \int_0^\infty \frac{(v'(1+\sigma_v^2 x/\sigma_u^2)}{2^{2N}\Gamma(2N)} e^{-v''(1+\sigma_v^2 x/\sigma_u^2)} \frac{dv'}{v'} \right]$$

$$= \frac{\sigma_v^2}{\sigma_u^2} \frac{\Gamma(2N)}{\Gamma^2(N)} \frac{(\sigma_v^2 x/\sigma_u^2)^{N-1}}{(1+\sigma_v^2 x/\sigma_u^2)^{2N}}, x \geq 0$$

$$F_X(x) = P[X \leq x] \quad (10)$$

$$= \int_{-\infty}^x f(x) dt$$

$$= \frac{\sigma_v^2}{\sigma_u^2} \frac{\Gamma(2N)}{\Gamma^2(N)} \int_0^x \frac{(\sigma_v^2 t/\sigma_u^2)^{N-1}}{(1+\sigma_v^2 t/\sigma_u^2)^{2N}} dt$$

$$= \frac{\Gamma(2N)}{\Gamma^2(N)} \int_0^{(\sigma_v^2 x/\sigma_u^2)/(1+\sigma_v^2 x/\sigma_u^2)} \left( \frac{u}{1-u} \right)^{N-1} \left( 1 + \frac{u}{1-u} \right)^{-2N} \frac{du}{(1-u^2)}$$

$$= \frac{\Gamma(2N)}{\Gamma^2(N)} \int_0^{(\sigma_v^2 x/\sigma_u^2)/(1+\sigma_v^2 x/\sigma_u^2)} u^{N-1}(1-u)^{N-1} du$$

$$= I_{\frac{(\sigma_v^2 x/\sigma_u^2)}{(1+\sigma_v^2 x/\sigma_u^2)^{2N}}}(N, N)$$

C2. $P_{FA}$ and $P_D$ Evaluation

In order to establish the ROC the inventors have developed a classical NP criterion in which the detection probability is maximized whilst the false alarm probability is maintained at a fixed value. Since the probability of false alarm for the energy ratio algorithm is given by Equation (11), one can obtain the threshold $\gamma$ under the condition of a constant $P_{FA}$ as given by Equation (12) where $I_b^{-1}(N, N)$ is the inverse incomplete beta function with parameters b and N.

$$P_{FA} = P[X > \gamma | H_0] = 1 - I_{\frac{(\gamma)}{(1+\gamma)}}(N, N) \quad (11)$$

$$\gamma = \frac{I_{1-P_{FA}}^{-1}(N, N)}{1 - I_{1-P_{FA}}^{-1}(N, N)} \quad (12)$$

Once the primary user becomes available in the band, the second window will contain the power of the primary user in addition to the power of the noise whereas the first window will contain only noise and hence, the receiver noise variance is represented by $\sigma_v^2$. Therefore, $\sigma_u^2 = \sigma_v^2 + \text{PNR} \times \sigma_v^2$ where PNR is the ratio of the primary user power to the secondary user noise power at the secondary user receiver. Hence, the detection probability can be expressed in terms of PNR as Equation (13).

$$P_D = P[X > \gamma | H_1] = 1 - I_{\frac{(\sigma_v^2 x/\sigma_u^2)}{(1+\sigma_v^2 x/\sigma_u^2)^{2N}}}(N, N) \quad (13)$$

$$P_D = 1 - I_{\frac{(\gamma/(1+\text{PNR}))}{(1+\gamma)/(1+\text{PNR})}}(N, N)$$

D. OFDM Challenges on Energy Ratio Algorithm

As noted supra there are challenges faced by conventional OFDM systems and possible techniques that have been introduced to address these challenges. The inventors demonstrate that with the adoption of these techniques their energy ratio algorithm according to embodiments of the invention does not require any additional complexity to the OFDM system with efficient detection capabilities.

D1. NBI and Power Leakage

By definition, the power of a NBI is concentrated in a small frequency band compared to the overall system bandwidth, see for example Galda et al. in "Narrow Band Interference Reduction in OFDM based Power Line Communication Systems" (Proc. IEEE Intl. Symp. Power Line Comms. and its Appl., 2001, pp. 345-351). Although the total power of the interference may be substantially lower than the total received signal power, these disturbances can reach a noise level which exceeds the received signal level by orders of magnitude inside the interference band. Therefore, the system performance will be severely degraded. Aside from NBI, the side-lobes of modulated OFDM sub-carriers even in case of having no NBI are known to be large. As a result, there is power leakage from sub-carriers to adjacent sub-carriers. It is known that the most efficient solution to NBI is to disable the sub-carriers corresponding to this interference. This will eliminate the effect of NBI at those sub-carriers, however, the signal to noise ratio at the other sub-carriers will be slightly reduced.

With respect to power leakage research within the prior art has addressed this problem. For example, the out of band leakages can be reduced by including special cancelling carriers at the edge of the band, see for example Brandes et al. in "Reduction of Out-of-Band Radiation in OFDM Systems by Insertion of Cancellation Carriers" (IEEE Comms. Lett., 2006, Vol. 10, pp. 420-422). These sub-carriers are modulated with complex weighting factors which are optimized such that the side-lobes of these carriers cancel the side-lobes of the original transmitted signal in a certain optimization range. An alternative solution is to suppress power leakage by use of a pre-coding technique, see for example Ma et al. in "Optimal Orthogonal Precoding for Power Leakage Suppression in DFT-based Systems" (IEEE Trans. Comms., 2011, Vol. 59, pp. 844-853). This pre-coding is applied to the frequency domain OFDM signal before the IDFT block at the transmitter side. At the receiver, a decoder is applied to omit the spectral distortion to the OFDM signal caused by pre-coding. This technique can totally eliminate the effect of spectral leakage but of course it needs full revision for all synchronization algorithms applied to traditional OFDM system.

By utilizing the fact that the energy ratio according to embodiments of the invention can perfectly counter any consistent noise like signals, windowing can be applied to the time domain OFDM symbols, see for example Zhang et al. in "Receiver Window Design for Narrowband Interference Suppression in IEEE 802.11a System" (10th Asia-Pacific Conf. on Comms. and 5th Intl. Sym. Multi-Dimensional Mobile Comms., 2004, Vol. 2, pp. 839-842), in order to limit the leakages and to reduce the influence of NBI. Thus, if a windowing function, e.g. a Nyquist window, is carefully chosen to only affect the interference while leaving the OFDM signal unchanged, then spectral leakage can be avoided. In Zhang, a folding technique is proposed in order not to use a double length DFT. In this case, the samples preceding the OFDM symbol to the end of the symbol are added to the samples following the symbol to its beginning. To evaluate the performance of our energy ratio detector in the presence of NBI and power leakage, we turn off the sub-carriers corresponding to the NBI. Moreover, the time domain windowing technique with folding is applied at the receiver side, as it offers the lowest computational complexity with sufficiently good performance.

D2. Inter-Carrier Interference Effect

In addition to the NBI and power leakage problems discussed supra, OFDM systems also suffer from ICI effects. The main sources for ICI in OFDM-based systems are the phase noise (PN), the carrier frequency offset (CFO), and the sampling frequency offset (SFO), see for example Muschallik in "Influence of RF Oscillators on an OFDM Signal" (IEEE Trans. Consumer Elect., Vol. 41, No. 3, pp. 592-603).

The phase noise is due to the instability of carrier signal generators used at the transmitter and receiver. In fact, the effect of PN can be greatly reduced by increasing the sub-carrier spacing, $\Delta f$. If we assume, that $\Delta f$ is large enough then ICI introduced by the PN may be neglected with respect to the ICI generated by either CFO or SFO. On the other hand, the carrier frequency offset is due to the difference between the carrier frequencies generated by the transmitter and receiver oscillators, or by the Doppler frequency shift. It is commonly represented by the normalized CFO which is the ratio of the frequency offset to the sub-carrier spacing, defined as $\varepsilon=\varepsilon_i+\varepsilon_f$ where $\varepsilon_i$ is the integer part of the normalized CFO while $\varepsilon_f$ is the fractional part. Even after estimating and compensating both integer and fractional CFO, a residual CFO, $\varepsilon_r$, which represents the remaining uncompensated fractional CFO always exists.

For the sampling frequency offset, it mainly exists due to the mismatch between the transmitter and receiver oscillators such that the received continuous-time waveform is sampled at an interval of $(1+\delta)T_S$ instead of $T_S$ where $T_S$ is the ideal sampling period and $\delta$, which is usually expressed in part per million or ppm, is the normalized difference between the periods of the two clocks. Referring to Tsai et al in "Joint Weighted Least-Squares Estimation of Carrier-Frequency Offset and Timing Offset for OFDM Systems over Multipath Fading Channels" (IEEE Trans. Vehic. Tech., Vol. 54, No. 1, pp. 211-223) $\delta$ is estimated by the receiver where compensation is carried out by feeding the clock generator with the amount of time shift in order to adjust the clock or by interpolating the received time domain samples with a fractional delay. It is known that the residual CFO and SFO results in ICI which degrades the Signal-to-Noise Ratio (SNR) over all sub-carriers. The SNR degradation, $SNRD_{CFO}$, due to the residual CFO has been analytically analyzed, see for example Pollet et al in "BER Sensitivity of OFDM Systems to Carrier Frequency Offset and Wiener Phase Noise" (IEEE Trans. Comms., Vol. 43, No. 234, pp. 191-193) (hereinafter Pollet1). Such analysis shows that in the Additive White Gaussian Noise (AWGN) channel and when the number of sub-carriers is large, the SNR degradation is given by Equation (14). Similarly, the SNR degradation due to the residual SFO, $\delta_r$, in the $k^{th}$ sub-carrier, $SNRD_{CFO}(k)$, may be analyzed, see for example Pollet et al. in "The BER Performance of OFDM Systems using Non-Synchronized Sampling" (IEEE Global Telecom. Conf. GLOBECOM. 1994, pp. 253-257) and is given by Equation (15).

$$SNRD_{CFO}|_{dB} = \frac{10}{3\ln(10)}(\pi\varepsilon_r)^2 SNR \quad (14)$$

$$SNRD_{CFO}(k)|_{dB} = 10\log_{10}\left(1 + \frac{1}{3}(\pi\delta_r k)^2 SNR\right) \quad (15)$$

Since CFO and SFO estimation and compensation is a requirement for traditional OFDM systems, the inventors have also considered these issues in respect of the energy ratio algorithm according to embodiments of the invention and how it behaves in the presence of ICI. It is important to note that the energy ratio algorithm according to embodiments of the invention does not require new solutions for OFDM synchronization problems but rather the energy ratio algorithm according to embodiments of the invention can provide good performance even with the existing prior art algorithms for the OFDM synchronization engine.

D2.A CFO Estimation and Compensation:

Any practical system assumes a maximum acceptable frequency offset, $CFO_{max}$, between the transmitter and receiver. Therefore, the integer CFO range is known by the maximum integer CFO, $\varepsilon_{imax}=\lfloor CFO_{max}/\Delta f\rfloor$. Accordingly, the integer CFO range will be $\Im=[-\varepsilon_{imax}, -\varepsilon_{imax}+1, \ldots, -1, 0, 1, \ldots, \varepsilon_{imax}-1, \varepsilon_{imax}]$. A two-step time domain estimation technique may be introduced for CFO, see for example Chiueh et al in "OFDM Baseband Receiver Design for Wireless Communications" (Wiley, 2007). This approach depends on the training symbols that are transmitted at the front of the OFDM frame. Actually, a good compromise between performance and complexity is achieved by this technique. The idea is to first estimate the fractional CFO by a maximum likelihood estimator as given by Equation (16) where y(n) is the received time domain signal and $D=N_S+N_g$.

$$\hat{\varepsilon}_f = \frac{1}{2\pi D}\angle\left\{\sum_{n=0}^{n-N_S-1} y(n)y*(n+D)\right\} \quad (16)$$

$$\hat{\varepsilon}_i = \max_{m\in\Im}\left|\sum_{n=0}^{n-N_S-1} y_{comp}(n)y_t*(n)e^{-2\pi jmn/D}\right| \quad (17)$$

This process then applies an autocorrelation to the time domain waveform with the condition that two or more training symbols are inserted at the beginning of the frame. The time domain signal is compensated for the fractional CFO resulting in the signal, $y_{comp}(n)$. This signal is then cross-correlated with the transmitted time domain waveform for the training symbols, $y_t$, after applying a progressive phase shift that depends on the desired integer CFO as given by Equation (17). This cross-correlation is then repeated for each integer CFO in $\Im$ and the maximum is searched for. The integer CFO that corresponds to the maximum correlation is selected as the estimated integer CFO. Once the normalized CFO is estimated, the OFDM signal can be compensated by rotating the phase of the time domain signal by $-2\pi(\hat{\varepsilon}_f+\hat{\varepsilon}_i)n$ where n is the time index.

D2.B. SFO Estimation and Compensation:

In the prior art of Tsai the carrier-frequency and timing offsets are jointly estimated by applying a Weighted Least-Squares (WLS) algorithm where a weighting matrix, W, is designed to improve the estimation accuracy of the least-squares. The analytical results in Tsai show that this matrix should be a function of the noise variance. In fact, if an incorrect (estimated) value of the noise variance is used, then the resulting estimation accuracy may perform rather poorly. Since the energy ratio algorithm according to embodiments of the invention is strong enough to overcome the effects of ICI, we can simply apply the WLS algorithm by replacing W with an identity matrix. This reduces the WLS algorithm into the well-known least-squares estimation. First, we compute the averaged phase difference between the pilots contained in two consecutive OFDM training symbols in the frequency domain to obtain $y=[y_0,$ $y_1, \ldots, y_{J-1}]^T$ where J is the number of pilots inserted in one preamble symbol. Second, the pilot sub-carrier indices denoted by $x_j$, $j=0,1,2, \ldots, J-1$ are arranged to construct the matrix X outlined in Equation (18) and accordingly the estimated carrier-frequency offset $\hat{\varepsilon}$ and timing offset $\hat{\delta}$ are obtained by using Equation (19).

$$X = \begin{bmatrix} x_0 & x_1 & x_2 & \ldots & x_{J-1} \\ 1 & 1 & 1 & \ldots & 1 \end{bmatrix}^T \quad (18)$$

$$\begin{bmatrix} \hat{\delta} & \hat{\varepsilon} \end{bmatrix} = \frac{N_S}{2\pi(N_S + N_g)} (X*X)^{-1} X*y \quad (19)$$

E: Rayleigh Fading Channel and Multi-Antenna System

Figure 3:
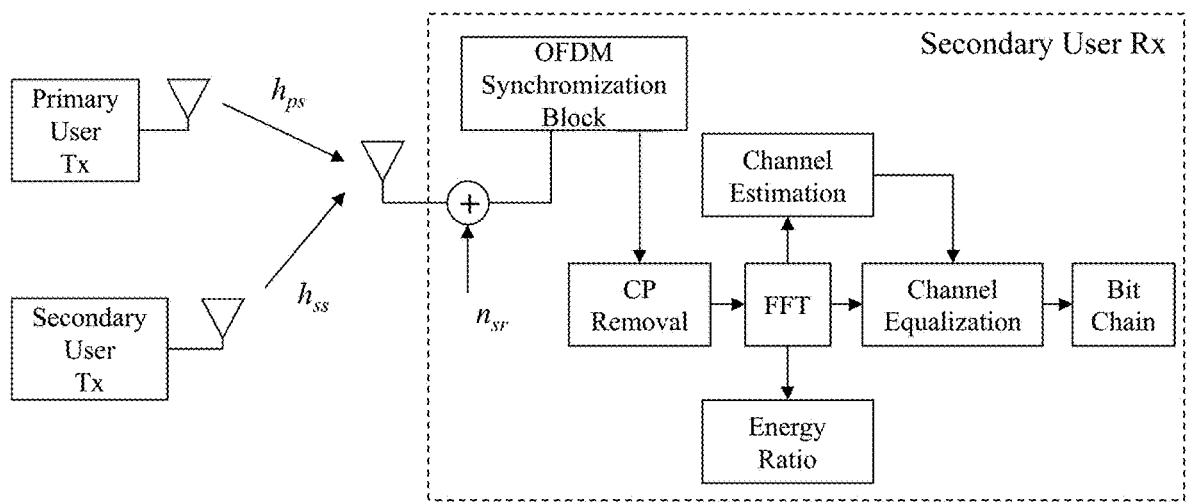
FIG. 3 depicts a communication model for a SISO system where the primary user channel and secondary user channel are considered.

To study the effect of the frequency selective Rayleigh fading channel on the energy ratio algorithm, consider first the single-input single output (SISO) model shown in FIG. 3 where the secondary transmitter communicates with one SU slave over the channel $h_{ss}$. During the transmission, the primary user may attempt transmission which is received by the secondary receiver across the channel $h_{ps}$. Both signals are combined at the receiver antenna and then processed as one received stream. The receiver noise is added to the combined signals and the result is converted to the frequency domain by the DFT block. The reserved tone sequence is then organized in order to be processed by the monitoring algorithm.

If $r_i^k$, $i=0, 1, \ldots, N_{RT}-1$ denotes the reserved tone indices for the $k^{th}$ OFDM symbol, then the $j^{th}$ reserved tone can be modelled as given by Equation (20) where $X_S(r_j^k)$, $X_P(r_j^k)$, $H_{SS}(r_i^k), H_{SP}(r_j^k)$ and $n(r_j^k)$ are the secondary user transmitted symbol, the primary user transmitted symbol, the frequency domain response for the secondary channel, the frequency domain response for the primary channel, and the noise sample, respectively, where these are all observed at sub-carrier $r_j^k$. Indeed, this is one of the most important properties for the OFDM technique in that the frequency selective fading can be converted into flat fading over each sub-carrier. Since the secondary transmitter forces the reserved tones to be null, then $X_S(r_j^k)=0$, $\forall j$ and hence the received reserved tones include the effect of the primary user and the noise of the secondary receiver under perfect synchronization and neglecting the power leakage effect.

$$Y(r_j^k) = H_{PS}(r_j^k) X_P(r_j^k) + H_{SS}(r_j^k) X_S(r_j^k) + n(r_j^k) \quad (20)$$

$$= H_{PS}(r_j^k) H_P(r_j^k) + n(r_j^k)$$

Now, suppose that the primary-to-secondary channel impulse response of a Rayleigh fading channel, $h_{PS}$, is modelled by a finite impulse response (FIR) filter with $N_g$ taps where each tap l has the channel gain $h_{PS}(l)$ for $l=0, 1, \ldots, N_g-1$. Here, we assume that the maximum delay of the multi-path fading channel is fully characterized by the cyclic prefix length. If we denote $\sigma_H^2$ as the sum of the channel tap power such that $\sigma_H^2 = \Sigma_{l=0}^{N_g-1} E\lfloor |h_{PS}(l)|^2 \rfloor$, then the conditional probability density function for either the real part or the imaginary part of the received symbol at index given that the transmitted symbol is $X_P(r_j^k)=a+jb$ can be obtained using Equation (21) where $\sigma_n^2$ is the noise variance, see for example Xu et al in "Statistical Distributions of OFDM signals on Multi-Path Fading Channel" (Intl. Conf. Wireless Comms. And Sig. Proc., 2011, pp. 1-6).

$$f_{Re\{Y(r_j^k)||X_P(r_j^k)=a+jb\}}(\omega) = f_{Im\{Y(r_j^k)||X_P(r_j^k)=a+jb\}}(\omega) \quad (21)$$

$$= \frac{1}{\sqrt{2\pi(\sigma_n^2 + (a^2+b^2)\sigma_H^2)}} \exp\left(\frac{-\omega^2}{2(\sigma_n^2 + (a^2+b^2)\sigma_H^2)}\right)$$

If the PU uses any Phase Shift Keying (PSK) modulation like QPSK, then the average symbol energy is simply $E_S=a^2+b^2$ and the received signal is modelled by a circularly symmetric Gaussian distribution with zero-mean and variance $\sigma_n^2+E_S\sigma_H^2$. In this case, the energy ratio algorithm according to an embodiment of the invention can still detect the reappearance of the primary user when the first window is filled with unwanted signals (i.e., $\sigma_u^2=\sigma_n^2$) and the second window includes both the unwanted signals and the primary user signal (i.e. $\sigma_u^2=\sigma_n^2+E_S\sigma_H^2$) The same performance as the AWGN case can be obtained. However, the primary to secondary power ratio is defined as $PNR=E_S/\sigma_n^2$ and hence the probability of detection will depend on the channel profile as given by Equation (22) where $\sigma_u^2=\sigma_v^2(1+ PNR\times \sigma_H^2)$. The conclusion is that the energy ratio algorithm according to embodiments of the invention can behave as in an AWGN channel even when the channel is frequency-selective for both primary and secondary users.

$$P_D = p[X > \gamma | H_1] \quad (22)$$

$$= 1 - I_{\frac{(\sigma_v^2\gamma/\sigma_u^2)}{(1+\sigma_v^2\gamma/\sigma_u^2)}} (N, N)$$

$$= 1 - I_{\frac{(\gamma/(1+\sigma_H^2 PNR))}{(1+\gamma/(1+\sigma_H^2 PNR))}} (N, N)$$

To enhance the detector performance in Rayleigh fading channels, multiple-antennas at the receiver side may be utilized. For Single-Input Multiple-Output (SIMO) or Multiple-Input Multiple-Output (MIMO) systems, if the number of receive antennas is $N_{Rx}$, there will be $N_{Rx}$, available sets of reserved tones at the receiver for each OFDM symbol or equivalently $N_{Rx} \times N_{Rx}$ tones every OFDM symbol. The energy ratio monitoring technique according to embodiments of the invention will combine all these sets to form the reserved tone sequence. In this case, the confidence of primary user presence is increased by the diversity gain offered by the system. This allows for more robust decision compared to the SISO case. Effectively, applying SIMO or MIMO is equivalent to increasing the window size by a factor of $N_{Rx}$. If the same performance is required, the window size can be reduced by $N_{Rx}$, which implies that the primary user power is sensed in less time when compared to the SISO case. Otherwise, increasing the window size directly increases the mean of the decision making variable under $H_1$ which allows for higher detection probability and less false alarm.

F. Complexity Overhead for Energy Ratio Algorithm

Figure 4:
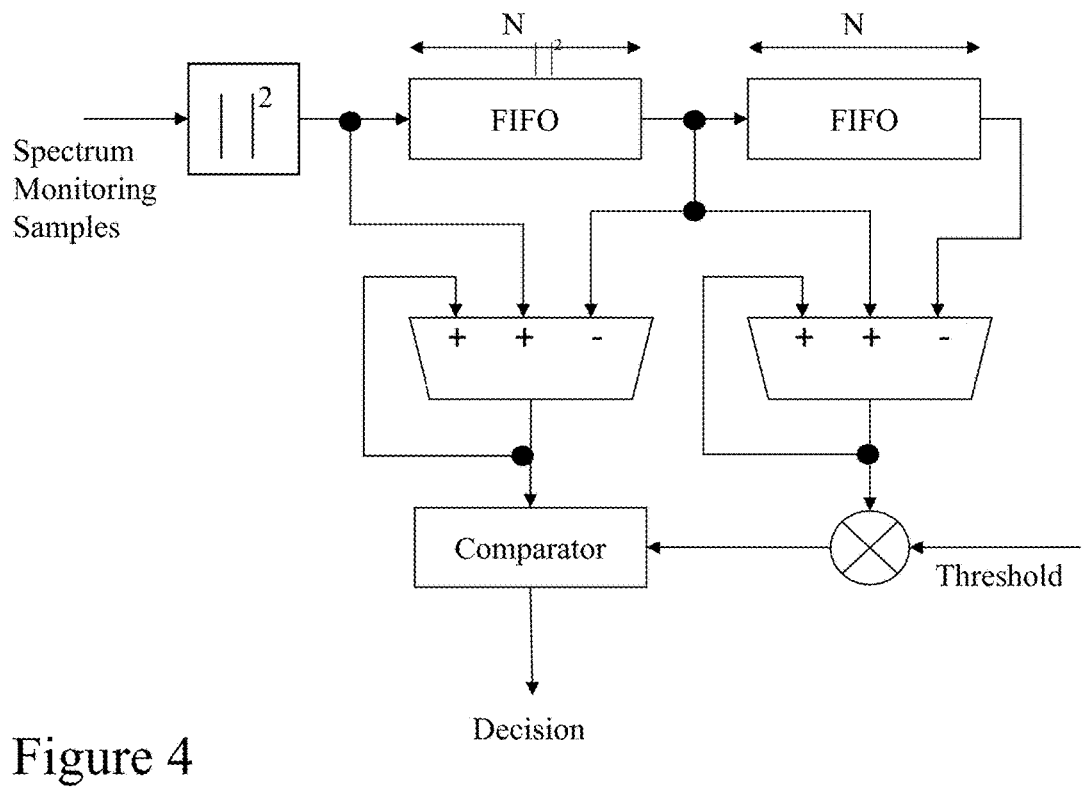
FIG. 4 depicts an exemplary architecture for an energy ratio algorithm according to an embodiment of the invention.

To evaluate the energy ratio from a complexity point of view, we propose an architecture for the algorithm and then analyze the corresponding complexity and compare it to the traditional energy detectors. The proposed architecture is shown in FIG. 4. First, the reserved tone sequence is injected to be squared. Next, two First-In First-Out (FIFO) memories are used to store the squared outputs in order to manage the energy evaluation for the two windows. The idea depends on the sliding concept for the windows where the total energy enclosed by one window can be evaluated by only adding the absolute squared of the new sample and subtracting the absolute squared of the last sample in the previous window as given by Equation (23).

$$V(k) = \sum_{i=k}^{N+k-1} |Z_i|^2 = V(k-1) + |Z_{N+k-1}|^2 - |Z_{k-1}|^2 \qquad (23)$$

The ratio may not be evaluated directly, instead we can multiply the energy of the first window by the threshold and the multiplication output is then compared to the energy of the second window. We conclude that the proposed architecture typically uses double the components applied for the traditional energy detector. Moreover, traditional spectrum sensing which is applied prior to spectrum monitoring surely involve multipliers and accumulators. To further reduce the complexity, these modules can be reused and shared with the energy ratio algorithm during spectrum monitoring as sensing and monitoring are non-overlapped in time.

G. Simulation Results

Within the simulation results presented in this section an OFDM system employing a total of $N_S$=1024 sub-carriers, 224 of which are used as guard bands on both ends of the signal band was employed. There were 32 pilot sub-carriers and $N_{RT}$=4 reserved tones, distributed across the entire 800 sub-carriers. Therefore, the throughput reduction due to reserved tones is only 0.5% which is only a small reduction for high data rates. The cyclic prefix is $N_g$=64 samples long and the sampling frequency is 16 MHz. The sub-carrier spacing is then $\Delta f$=15.625 kHz which is large enough to neglect the phase noise distortion and the time domain windowing effect. Unless otherwise specified, the frame has two consecutive training symbols, 256 OFDM data symbols, and the reserved tone spacing $\Delta_r$=2. The data for both primary and secondary transmitters is modulated by 16-PSK mapper and the secondary power to noise ratio in the absence of primary signal is assumed to be 9 dB. When the system operates under non-perfect synchronization, the maximum acceptable CFO is assumed to be 400 kHz, the CFO is 320 kHz, and the sampling clock offset is assumed to be 100 ppm.

G1. Analytical Verification

Figure 5:
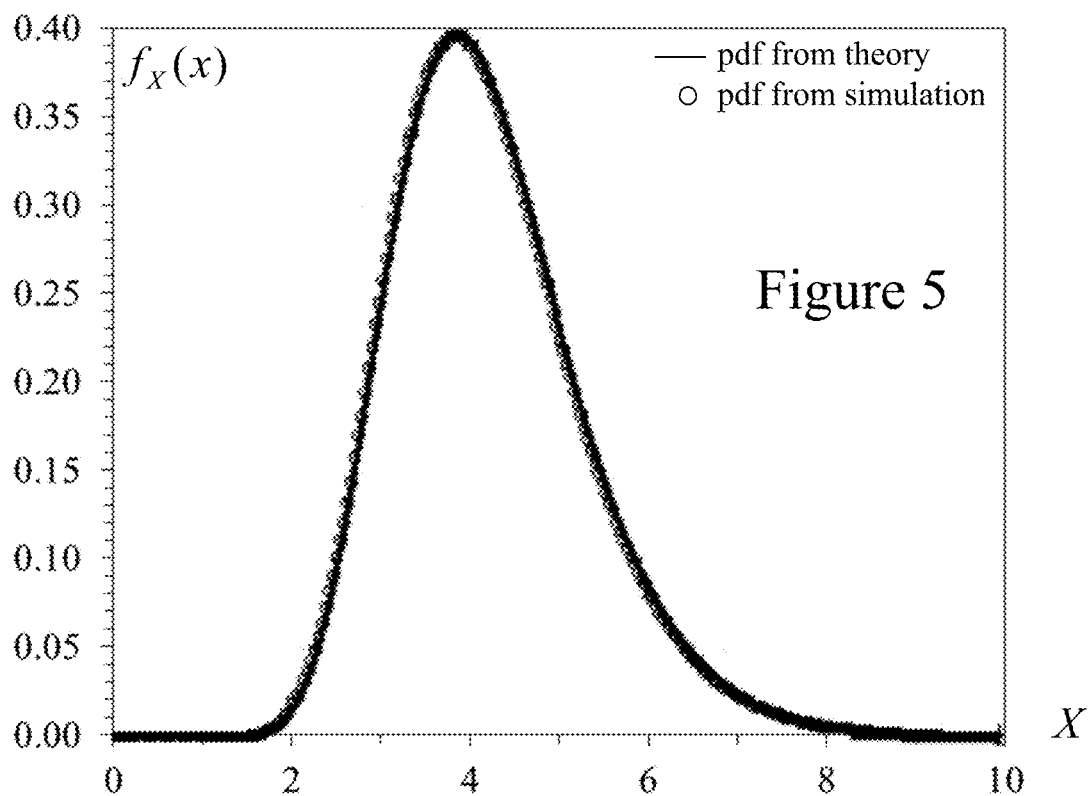
FIG. 5 depicts simulated PDF versus analytical PDF for the energy ratio decision making variables with N=32 and $10\log_{10}(\sigma_u^2/\sigma_v^2)=5$ dB according to an embodiment of the invention.

Referring to FIG. 5 there is depicted a comparison between the PDF given by Equation (9) and the one obtained from simulation where we have used $10 \log_{10}(\sigma_u^2/\sigma_v^2)$=5 dB and an energy ratio window N=32. To obtain the simulated PDF, $10^7$ circularly symmetric Gaussian distributed samples are generated and scaled properly for both windows. The samples are then applied to the energy ratio algorithm and the PDF is obtained by considering the histogram of the decision making variable. It is evident from FIG. 5 that the analytical results are in excellent agreement with the simulated ones.

Figure 6:
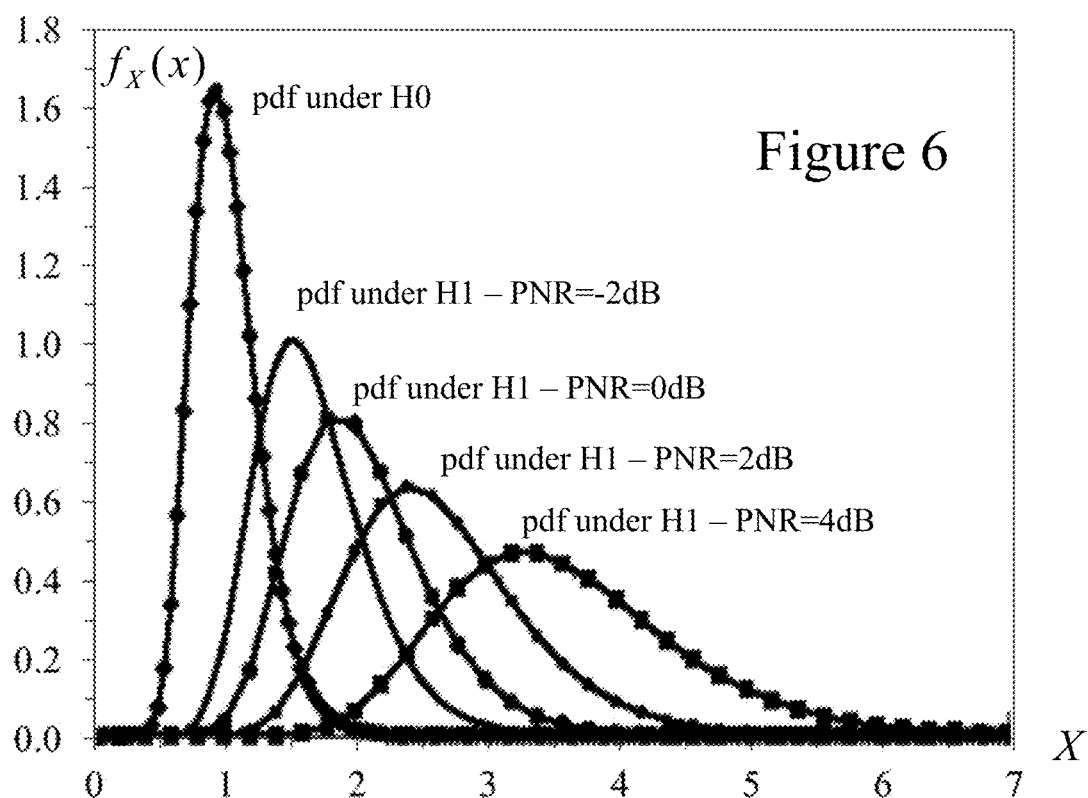
FIG. 6 depicts the conditional PDF under $H_0$ and conditional PDF under $H_1$ for PNR=−2, 0, 2, and 4 dB according to an embodiment of the invention.

Next, the hypothesis test is to be verified by exploring the conditional PDF under both $H_0$ and $H_1$. In fact, when there is no primary user in band, the decision variable follows only one unique PDF as is shown in FIG. 6. Under $H_1$, the conditional PDF depends on the PNR ratio. Four additional curves are also shown in FIG. 6 for the conditional PDF under $H_1$ with four different PNR values (−2, 0, 2, and 4 dB). It is clear that the decision variable can distinguish between no primary user case and primary user presence based on the PNR.

G2. Receiver Characteristics

Figure 7:
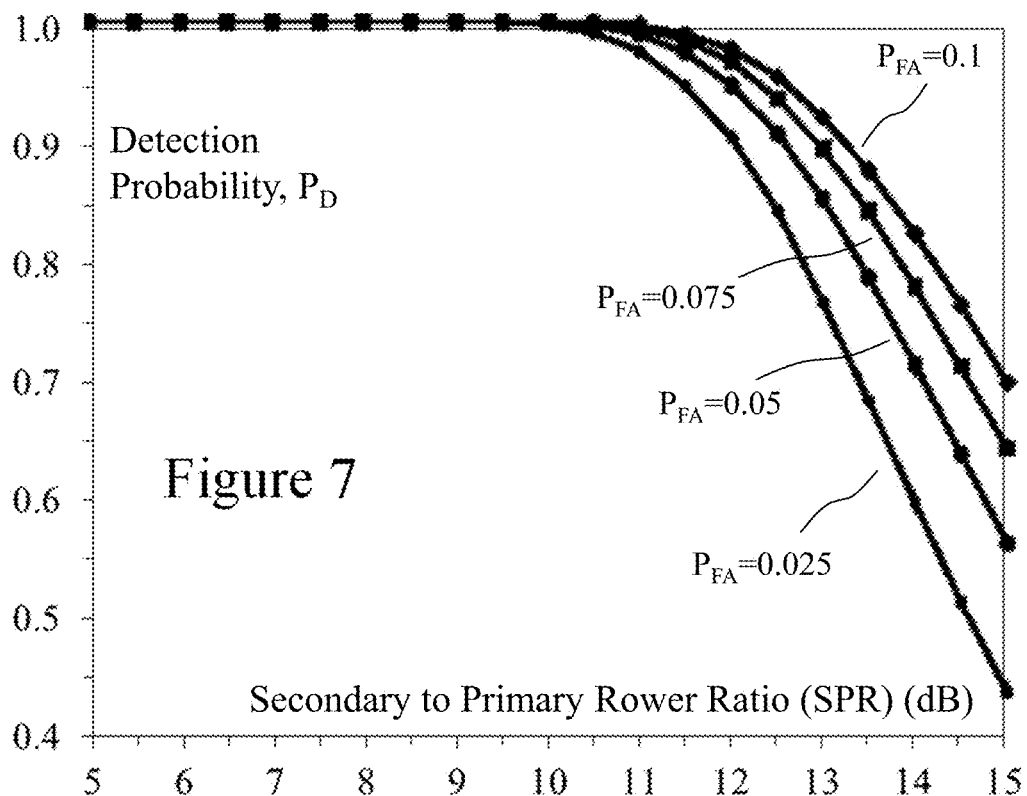
FIG. 7 depicts the detection probability at fixed false alarm probability under perfect synchronization and neglecting the power leakage effect according to an embodiment of the invention.

The detection probability for four different false alarm probabilities is shown in FIG. 7. The horizontal axis denotes the secondary to primary power ratio (SPR) which is related to the primary to secondary noise ratio (PNR) such that $PNR_{dB}$=$SNR|_{dB}$− $SPR|_{dB}$ where SNR is the secondary power to noise power ratio. It is evident that whilst PNR is the ratio that determines the performance of the energy ratio algorithm according to embodiments of the invention that SPR is a main parameter by which a monitoring algorithm is evaluated.

Figure 8:
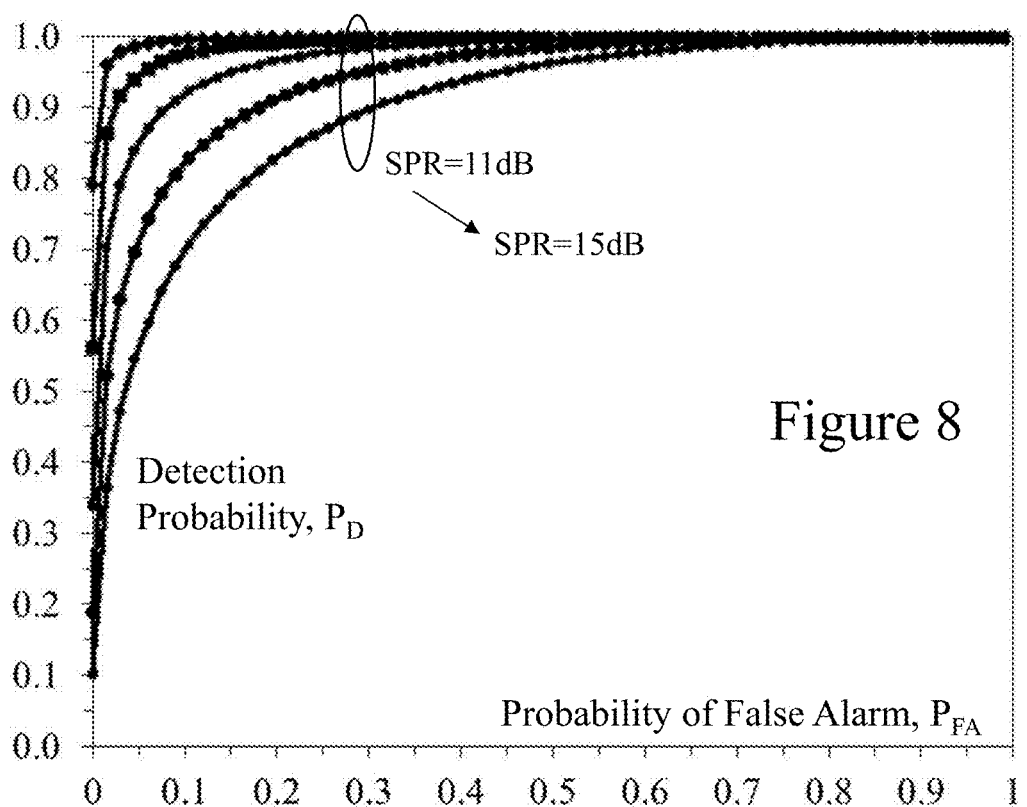
FIG. 8 depicts receiver operating characteristics for different PNR values under perfect synchronization and neglecting the power leakage effect according to an embodiment of the invention.
Figure 9:
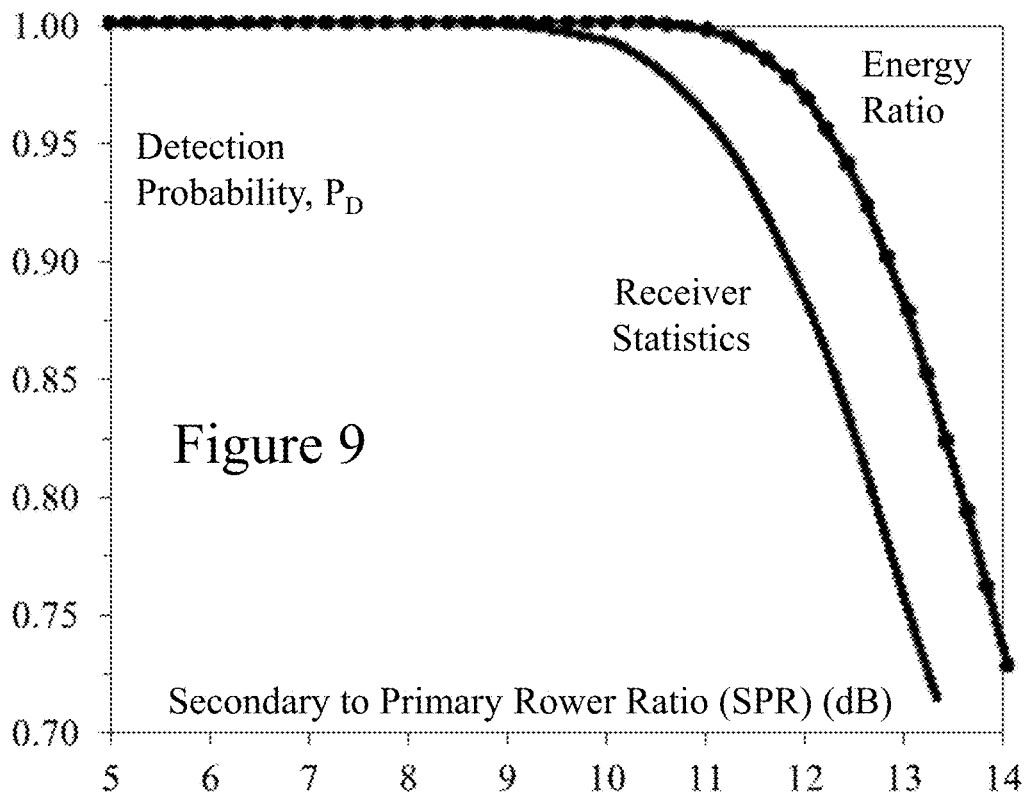
FIG. 9 depicts comparison between energy ratio and receiver statistics algorithms in case of QPSK, SNR=6 dB, $P_{FA}=0.04$, and N=128 according to an embodiment of the invention.

The ROC for the energy ratio algorithm according to an embodiment of the invention is shown in FIG. 8. These results are obtained by simulating the OFDM system twice, one when primary signal is present and the second when it is absent. The system is run over $10^6$ realizations and the probability of detection or false alarm is evaluated. The threshold is set based on the theoretical value given by Equation (12). In order to compare the proposed monitoring algorithm with the receiver statistics technique found in Boyd, the OFDM system is simulated such that the system parameters match the simulation environment presented by Boyd. The simulation is run for quad Quadrature Amplitude Modulation (4-QAM) under SNR=6 dB, $P_{FA}$=0.04, and N=128. Referring to FIG. 9 the simulation results for the detection probability of the energy ratio algorithm according to an embodiment of the invention are presented with comparison to the results obtained in Boyd. In addition of having fast detection, it is evident that the energy ratio algorithm according to an embodiment of the invention shows a better performance than the receiver statistics algorithm.

G3. OFDM Challenges

The power leakage was modelled by applying oversampling to the frequency domain signal, where the number of points at the receiver DFT is four times the number of points used at the transmitter. A time domain Hanning window with folding was applied at the receiver to limit the NBI and power leakage. Also the phase of the time domain samples was rotated by $2\pi\epsilon n$ to model the receiver CFO where n is the time index. Moreover, the received signal is re-sampled at time instances that are multiple of $(1+\delta)T_S$, to model the receiver SFO. The preamble detection and the exact frame timing are assumed to be perfect. Here the time domain preamble is used to estimate and compensate for the CFO. The CFO compensated signal is converted to the frequency domain via DFT. The SFO, $\hat{\delta}$, and the residual CFO are further estimated by applying the least squares algorithm discussed in Section DB.2 supra. Moreover, the time domain signal is re-sampled according to the delay $\hat{\delta}$ to compensate for the SFO.

Figure 10:
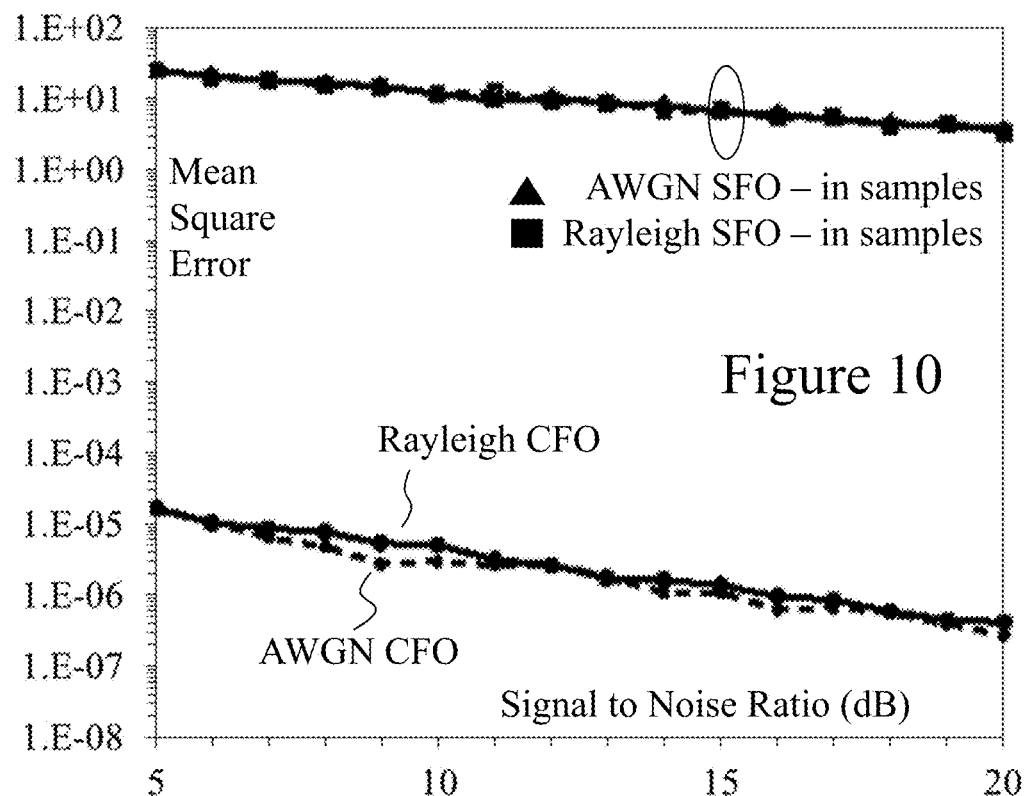
FIG. 10 depicts the MSE for both CFO and SFO estimation under AWGN and Rayleigh fading channels where the MSE for SFO is measured in samples according to an embodiment of the invention.

Now referring to FIG. 10 there are depicted the mean square errors for the estimated CFO and SFO. From these results, we can see that the residual fractional CFO and SFO at 9 dB are $9 \times 10^{-3}$ and $5 \times 10^{-6}$, respectively. This implies SNR degradation of $SNRD_{CFO}$=0.0092 dB for CFO, and $SNRD_{SFO}(1023)$=0.003 dB for SFO at the last sub-carrier, based upon Equations (14) and (15), respectively. This shows the advantages of the powerful estimation techniques we have chosen for the OFDM synchronization engine.

To examine the combined effects of OFDM impairments, the detection probability for the energy ratio is simulated in the presence of power leakage, CFO, and SFO as shown in FIG. 11. As outlined supra, the energy ratio algorithm according to embodiments of the invention is shown to be robust to OFDM challenges as only minor degradations in detection performance are noted compared to the perfect case for the common OFDM signal degradation mechanisms. For instance, the overall loss due to all impairments is only 0.4 dB at a detection probability $P_D$=0.9.

G4. Effect of Frequency-Selective Fading

In order to study the effect of frequency-selectivity on the proposed energy ratio technique, the channel was modelled as a linear time-varying filter whose impulse response, h(n), which is obtained by:
(1) $N_g$ circularly symmetric Gaussian samples with unit variance. The number of channel taps is defined by the cyclic prefix length as we assume that the cyclic prefix fully defines the channel maximum excess delay; and
(2) The samples are scaled to fit the required power delay profile which is assumed to be exponentially decaying, see for example Rinne in "An Equalization Method using Preliminary Decisions for Orthogonal Frequency Division Multiplexing Systems in Channels with Frequency Selective Fading" (IEEE Vehicular Tech. Conf., Mobile Technology for the Human Race, Vol. 3, 1996, pp. 1579-1583. Accordingly, the channel tap l is scaled by exp(−l) for l=0, 1, 2, . . . , $N_g$−1.

The OFDM system was simulated in a Rayleigh fading channel for different SPR. In FIG. 12 the effect of Rayleigh fading channel on the energy ratio performance for SISO, 2×2 MIMO, and 4×4 MIMO systems is presented. The Rayleigh fading channel effect is compared with the AWGN channel where only a minor degradation is evident due to the narrow band problem. From these results, it would be evident that having more receive antennas will offer enhancement to the detection accuracy of the energy ratio detector according to embodiments of the invention.

Whilst embodiments of the invention have been described and depicted supra in respect of an OFDM communications system it would be evident that the concepts of reserved tones and the detection of a primary user by secondary users may be employed in other communication systems without departing from the scope of the invention. Within the embodiments of the invention been described and depicted supra reference has been made to IEEE 802.22 although it would be evident that other standards including, but not limited to, Digital Audio Broadcasting (DAB), Digital Video Broadcasting—Terrestrial/Second Generation Terrestrial (DVB-T/T2), Digital Video Broadcasting—Handheld (DVB-H), Digital Terrestrial Multimedia Broadcast (DTMB), Long Term Evolution (LTE), LTE Advanced 4G, WiMAX (IEEE 802.16d/e), Wi-Fi (IEEE 802.11a/g/n/ac/ad), WiMedia/ECSM-368 may be employed together with new communications standards/protocols.

Specific details are given in the above description to provide a thorough understanding of the embodiments. However, it is understood that the embodiments may be practiced without these specific details. Accordingly, embodiments of the invention may be implemented as an algorithm executed by a microprocessor or alternatively the algorithm may be implemented as an application specific integrated circuit. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code. In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of transmitting data with a wireless transmitter comprising:
   receiving at the transmitter the data to be transmitted;
   segmenting the received data into a plurality of blocks;
   modulating each block of the plurality of blocks with a constellation mapper;
   constructing and transmitting for each block of the plurality of blocks an orthogonal frequency division multiplexing (OFDM) frame; and
   processing each block after segmentation before modulating it such that each block is randomized, channel encoded and interleaved separately relative to the other blocks of the plurality of blocks; wherein
   each OFDM frame comprises:
     one or more training symbols or preambles;
     the modulated data; and
     one or more modulated pilot signals encoded according to a predetermined protocol.

2. The method according to claim 1, wherein
   the predetermined protocol for modulating the one or more pilot signals is binary phase-shift keying (BPSK).

3. The method according to claim 1, wherein
   the modulated data for each block of the plurality of blocks is transmitted upon a first predetermined subset of a predetermined set of frequencies;
   the one or more modulated pilot signals for each block of the plurality of blocks are transmitted upon a second predetermined subset of the predetermined set of frequencies; and
   the first predetermined subset of the predetermined set of frequencies and the second predetermined subset of the predetermined set of frequencies for each block of the plurality of blocks do not overlap.

4. The method according to claim 1, wherein
   the modulated data for each block of the plurality of blocks is transmitted upon a first predetermined subset of a predetermined set of frequencies;
   the one or more modulated pilot signals for each block of the plurality of blocks are transmitted upon a second predetermined subset of the predetermined set of frequencies; and
   for each block of the plurality of blocks one or more frequencies of the predetermined set of frequencies are reserved for reserved tones.

5. The method according to claim 1, wherein
   the modulated data for each block of the plurality of blocks is transmitted upon a first predetermined subset of a predetermined set of frequencies;
   the one or more modulated pilot signals for each block of the plurality of blocks are transmitted upon a second predetermined subset of the predetermined set of frequencies; and
   for each block of the plurality of blocks one or more frequencies of the predetermined set of frequencies are reserved for reserved tones;
   the predetermined set of frequencies is a grid of N channels;
   the one or more frequencies reserved for the reserved tones are a pair of frequencies; and
   the reserved tones change according to a predetermined sequence for each block of the plurality of blocks.

6. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies; and
for each block of the plurality of blocks one or more frequencies of the predetermined set of frequencies are reserved for reserved tones;
the predetermined set of frequencies is a grid of N channels;
the one or more frequencies reserved for the reserved tones is a set of M frequencies within the predetermined set of frequencies;
the reserved tones change according to a predetermined sequence for each block of the plurality of blocks; and
at least one of M and the separation between the reserved tones varies in dependence upon one or more parameters of at least one of a wireless system of which the transmitter is part and a protocol the wireless transmitter is operating according to.

7. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
a frequency of the set of frequencies is reserved for a non-modulated sub-carrier; and
the frequency of the set of frequencies is constant for each block of the plurality of blocks.

8. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
the first predetermined subset of a predetermined set of frequencies varies for each block of the plurality of blocks; and
the second predetermined subset of a predetermined set of frequencies varies for each block of the plurality of blocks.

9. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
for each block of the plurality of blocks one or more frequencies of the predetermined set of frequencies are reserved for reserved tones;
a frequency of the set of frequencies is reserved for a non-modulated sub-carrier.

10. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
for each block of the plurality of blocks one or more frequencies of the predetermined set of frequencies are reserved for reserved tones;
a third predetermined subset of a predetermined set of frequencies are null;
a frequency of the set of frequencies is reserved for a non-modulated sub-carrier.

11. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies; and
for each block of the plurality of blocks one or more frequencies of the predetermined set of frequencies are reserved for reserved tones;
the predetermined set of frequencies is a grid of N channels;
the one or more frequencies reserved for the reserved tones is a set of M frequencies within the predetermined set of frequencies;
the reserved tones change after a predetermined period of time; and
the cycle of reserve tones periodically cycles the advancement back to a predetermined point upon a predetermined event occurring.

12. The method according to claim 1, wherein
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies; and
for each block of the plurality of blocks one or more frequencies of the predetermined set of frequencies are reserved for reserved tones;
the predetermined set of frequencies is a grid of N channels;
the one or more frequencies reserved for the reserved tones is a set of M frequencies within the predetermined set of frequencies;
the reserved tones change according to a predetermined sequence of a plurality of predetermined sequences; and
the reserved tones change to a new predetermined sequence of the plurality of predetermined sequences of reserved frequency tones in dependence upon a predetermined time limit being reached since a current predetermined sequences of reserved frequency tones was established.

13. The method according to claim 1, wherein
a sequence of $N_G$ samples of each OFDM frame at the beginning of the received OFDM frame are the last $N_G$ samples of the preceding OFDM frame copied to the beginning of the OFDM frame in order to provide a guard time or cyclic prefix.

14. The method according to claim 1, wherein
a preamble for each OFDM frame comprises first data transmitted upon a upon a first predetermined subset of a predetermined set of frequencies; and the modulated data for each OFDM frame comprises second data transmitted upon a second predetermined subset of a predetermined set of frequencies; and the modulated pilot signals for each OFDM frame comprises a number $N_{RT}$ of reserved tones, each reserved tone upon a predetermined frequency of $N_{RT}$ predetermined frequencies; wherein the first predetermined subset of a predetermined set of frequencies includes the $N_{RT}$ predetermined frequencies; and the second predetermined subset of a predetermined set of frequencies does not include the $N_{RT}$ predetermined frequencies.

15. The method according to claim 14, wherein the predetermined set of frequencies are a grid of frequencies; and the sequence of $N_{RT}$ reserved tones cycles from an end of the grid of frequencies to the beginning of the grid of frequencies when an $N_{RT}$ reserved tone reaches the end of the grid of frequencies.

16. A method of transmitting data with a wireless transmitter comprising:

receiving at the transmitter the data to be transmitted;

segmenting the received data into a plurality of blocks;

modulating each block of the plurality of blocks with a constellation mapper; and constructing and transmitting for each block of the plurality of blocks an orthogonal frequency division multiplexing (OFDM) frame; wherein each OFDM frame comprises:

one or more training symbols or preambles;

the modulated data; and one or more modulated pilot signals encoded according to a predetermined protocol; and the wireless transmitter further executes at least one of a first process and a second process;

in the first process:

the modulated data for each block of the plurality of blocks is transmitted upon a first predetermined subset of a predetermined set of frequencies;

the one or more modulated pilot signals for each block of the plurality of blocks are transmitted upon a second predetermined subset of the predetermined set of frequencies; and the first predetermined subset of the predetermined set of frequencies and the second predetermined subset of the predetermined set of frequencies for each block of the plurality of blocks do not overlap; and in the second process:

the modulated data for each block of the plurality of blocks is transmitted upon a first predetermined subset of a predetermined set of frequencies;

the one or more modulated pilot signals for each block of the plurality of blocks are transmitted upon a second predetermined subset of the predetermined set of frequencies; and for each block of the plurality of blocks one or more frequencies of the predetermined set of frequencies are reserved for reserved tones.

17. A method of transmitting data with a wireless transmitter comprising:

receiving at the transmitter the data to be transmitted;

segmenting the received data into a plurality of blocks;

modulating each block of the plurality of blocks with a constellation mapper; and constructing and transmitting for each block of the plurality of blocks an orthogonal frequency division multiplexing (OFDM) frame; wherein each OFDM frame comprises:

one or more training symbols or preambles;

the modulated data; and one or more modulated pilot signals encoded according to a predetermined protocol; and the wireless transmitter further executes at least one of a first process and a second process;

in the first process:

the modulated data for each block of the plurality of blocks is transmitted upon a first predetermined subset of a predetermined set of frequencies;

the one or more modulated pilot signals for each block of the plurality of blocks are transmitted upon a second predetermined subset of the predetermined set of frequencies;

for each block of the plurality of blocks one or more frequencies of the predetermined set of frequencies are reserved for reserved tones;

the predetermined set of frequencies is a grid of N channels;

the one or more frequencies reserved for the reserved tones are a pair of frequencies; and the reserved tones change according to a predetermined sequence for each block of the plurality of blocks; and in the second process:

the modulated data for each block of the plurality of blocks is transmitted upon a first predetermined subset of a predetermined set of frequencies;

the one or more modulated pilot signals for each block of the plurality of blocks are transmitted upon a second predetermined subset of the predetermined set of frequencies; and for each block of the plurality of blocks one or more frequencies of the predetermined set of frequencies are reserved for reserved tones;

the predetermined set of frequencies is a grid of N channels;

the one or more frequencies reserved for the reserved tones is a set of M frequencies within the predetermined set of frequencies;

the reserved tones change according to a predetermined sequence for each block of the plurality of blocks; and at least one of M and the separation between the reserved tones varies in dependence upon one or more parameters of at least one of a wireless system of which the transmitter is part and a protocol the wireless transmitter is operating according to.

18. A method of transmitting data with a wireless transmitter comprising:

receiving at the transmitter the data to be transmitted;

segmenting the received data into a plurality of blocks;

modulating each block of the plurality of blocks with a constellation mapper; and constructing and transmitting for each block of the plurality of blocks an orthogonal frequency division multiplexing (OFDM) frame; wherein each OFDM frame comprises:

one or more training symbols or preambles;

the modulated data; and one or more modulated pilot signals encoded according to a predetermined protocol; and the wireless transmitter further executes at least one of a first process and a second process;
in the first process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies; and
a frequency of the set of frequencies is reserved for a non-modulated sub-carrier; and
the frequency of the set of frequencies is constant for each block of the plurality of blocks; and
in the second process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
the first predetermined subset of a predetermined set of frequencies varies for each block of the plurality of blocks; and
the second predetermined subset of a predetermined set of frequencies varies for each block of the plurality of blocks.

19. A method of transmitting data with a wireless transmitter comprising:
receiving at the transmitter the data to be transmitted;
segmenting the received data into a plurality of blocks;
modulating each block of the plurality of blocks with a constellation mapper; and
constructing and transmitting for each block of the plurality of blocks an orthogonal frequency division multiplexing (OFDM) frame; wherein
each OFDM frame comprises:
one or more training symbols or preambles;
the modulated data; and
one or more modulated pilot signals encoded according to a predetermined protocol; and
the wireless transmitter further executes at least one of a first process and a second process;
in the first process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
for each block of the plurality of blocks one or more frequencies of the predetermined set of frequencies are reserved for reserved tones; and
a frequency of the set of frequencies is reserved for a non-modulated sub-carrier; and
in the second process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
for each block of the plurality of blocks one or more frequencies of the predetermined set of frequencies are reserved for reserved tones;
a third predetermined subset of a predetermined set of frequencies are null; and
a frequency of the set of frequencies is reserved for a non-modulated sub-carrier.

20. A method of transmitting data with a wireless transmitter comprising:
receiving at the transmitter the data to be transmitted;
segmenting the received data into a plurality of blocks;
modulating each block of the plurality of blocks with a constellation mapper; and
constructing and transmitting for each block of the plurality of blocks an orthogonal frequency division multiplexing (OFDM) frame; wherein
each OFDM frame comprises:
one or more training symbols or preambles;
the modulated data; and
one or more modulated pilot signals encoded according to a predetermined protocol; and
the wireless transmitter further executes at least one of a first process and a second process;
in the first process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies;
for each block of the plurality of blocks one or more frequencies of the predetermined set of frequencies are reserved for reserved tones;
the predetermined set of frequencies is a grid of N channels;
the one or more frequencies reserved for the reserved tones is a set of M frequencies within the predetermined set of frequencies;
the reserved tones change after a predetermined period of time; and
the cycle of reserve tones periodically cycles the advancement back to a predetermined point upon a predetermined event occurring; and
in the second process:
the modulated data for each block of the plurality of blocks is transmitted upon a first predetermined subset of a predetermined set of frequencies;
the one or more modulated pilot signals for each block of the plurality of blocks are transmitted upon a second predetermined subset of the predetermined set of frequencies; and
for each block of the plurality of blocks one or more frequencies of the predetermined set of frequencies are reserved for reserved tones;
the predetermined set of frequencies is a grid of N channels;
the one or more frequencies reserved for the reserved tones is a set of M frequencies within the predetermined set of frequencies;
the reserved tones change according to a predetermined sequence of a plurality of predetermined sequences; and
the reserved tones change to a new predetermined sequence of the plurality of predetermined sequences of reserved frequency tones in dependence upon a predetermined time limit being reached since a current predetermined sequences of reserved frequency tones was established.

21. A method of transmitting data with a wireless transmitter comprising:
  receiving at the transmitter the data to be transmitted;
  segmenting the received data into a plurality of blocks;
  modulating each block of the plurality of blocks with a constellation mapper; and
  constructing and transmitting for each block of the plurality of blocks an orthogonal frequency division multiplexing (OFDM) frame; wherein
  each OFDM frame comprises:
    one or more training symbols or preambles;
    the modulated data; and
    one or more modulated pilot signals encoded according to a predetermined protocol;
  a preamble for each OFDM frame comprises first data transmitted upon a upon a first predetermined subset of a predetermined set of frequencies;
  the modulated data for each OFDM frame comprises second data transmitted upon a second predetermined subset of a predetermined set of frequencies;
  the modulated pilot signals for each OFDM frame comprises a number $N_{RT}$ of reserved tones, each reserved tone upon a predetermined frequency of $N_{RT}$ predetermined frequencies;
  the first predetermined subset of a predetermined set of frequencies includes the $N_{RT}$ predetermined frequencies; and
  the second predetermined subset of a predetermined set of frequencies does not include the $N_{RT}$ predetermined frequencies.

22. The method according to claim 21, wherein
  the predetermined set of frequencies are a grid of frequencies; and
  the sequence of $N_{RT}$ reserved tones cycles from an end of the grid of frequencies to the beginning of the grid of frequencies when an $N_{RT}$ reserved tone reaches the end of the grid of frequencies.

* * * * *